United States Patent
Beardslee et al.

(10) Patent No.: US 9,852,429 B2
(45) Date of Patent: Dec. 26, 2017

(54) METHOD AND SYSTEM FOR GENERATING A GLOBAL REPRESENTATION OF A PRODUCT DEFINITION

(71) Applicant: Ford Global Technologies, LLC, Dearborn, MI (US)

(72) Inventors: James Beardslee, Grosse Pointe, MI (US); Jian Lin, Chelsea, MI (US); Veera V. M. L. Ganesh Babu Alla, Farmington Hills, MI (US); Gintaras Vincent Puskorius, Novi, MI (US); Bryan Roger Goodman, Northville, MI (US); Ravindranatha Kundoor, Farmington Hills, MI (US); Yu-Ning Liu, Ann Arbor, MI (US); Yakov M. Fradkin, Farmington Hills, MI (US); Melinda Kaye Hunsaker, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 887 days.

(21) Appl. No.: 13/842,069

(22) Filed: Mar. 15, 2013

(65) Prior Publication Data
US 2014/0282361 A1    Sep. 18, 2014

Related U.S. Application Data

(63) Continuation of application No. 13/840,497, filed on Mar. 15, 2013, now Pat. No. 9,098,854.

(51) Int. Cl.
G06Q 30/00    (2012.01)
G06F 9/44     (2006.01)

(52) U.S. Cl.
CPC .............. *G06Q 30/018* (2013.01); *G06F 8/20* (2013.01)

(58) Field of Classification Search
CPC .............................. G06Q 30/06; G06Q 30/08
(Continued)

(56) References Cited

U.S. PATENT DOCUMENTS 5,515,524 A    5/1996  Lynch et al.
5,708,798 A    1/1998  Lynch et al.
(Continued)

OTHER PUBLICATIONS

Trilogy Development Group Assigned Patent Targeted News Service [Washington, DC, Jun. 2, 20011, downloaded from ProQUestDIrect on the Internet on Oct. 9, 2015, 8 pages.*
(Continued)

*Primary Examiner* — James Zurita
(74) *Attorney, Agent, or Firm* — Raymond L. Coppiellie; Brooks Kushman P.C.

(57) ABSTRACT

A method or system that receives a product definition that includes a feature family having data defining one or more product features. The product definition including one or more corresponding rules defining one or more relationships between one or more product features. The method or system receiving input selecting one or more feature families of interest. The method or system identifying the one or more rules that provide a relationship connecting the one or more feature families to the selected feature families of interest. The method or system converting the identified rules to one or more positive logic rule groups. The method or system generating one or more global representations of the product definition by interacting the one or more positive logic rule groups to produce a result that defines the relationship between the interacted positive logic rule groups and storing the results that are determined as being valid.

11 Claims, 18 Drawing Sheets

(58) Field of Classification Search
USPC .............................................. 705/26.1, 27.1
See application file for complete search history.

(56) References Cited

U.S. PATENT DOCUMENTS

| | | | |
|---|---|---|---|
| 5,825,651 | A | 10/1998 | Gupta et al. |
| 6,002,854 | A | 12/1999 | Lynch et al. |
| 6,115,547 | A | 9/2000 | Ghatate et al. |
| 6,405,308 | B1 | 6/2002 | Gupta et al. |
| 6,430,730 | B1 | 8/2002 | Ghatate et al. |
| 6,473,898 | B1 | 10/2002 | Waugh et al. |
| 6,647,396 | B2 | 11/2003 | Parnell et al. |
| 6,675,294 | B1 | 1/2004 | Gupta et al. |
| 6,834,282 | B1 | 12/2004 | Bonneau et al. |
| 6,836,766 | B1 | 12/2004 | Gilpin et al. |
| 6,865,524 | B1 | 3/2005 | Shah et al. |
| 6,978,273 | B1 | 12/2005 | Bonneau et al. |
| 7,003,360 | B1 | 2/2006 | Dillon |
| 7,043,407 | B2 | 5/2006 | Lynch et al. |
| 7,062,493 | B1 | 6/2006 | Babka et al. |
| 7,130,821 | B1 | 10/2006 | Connors et al. |
| 7,188,335 | B1 | 3/2007 | Darr et al. |
| 7,200,582 | B1 | 4/2007 | Smith |
| 7,343,584 | B1 | 3/2008 | Plain et al. |
| 7,426,481 | B1 | 9/2008 | Connors et al. |
| 7,464,064 | B1 | 12/2008 | Smith |
| 7,567,922 | B1 * | 7/2009 | Weinberg ............ G06Q 30/0621 705/26.5 |
| 7,653,583 | B1 | 1/2010 | Leeb et al. |
| 7,698,170 | B1 | 4/2010 | Darr et al. |
| 7,739,080 | B1 | 6/2010 | Beck et al. |
| 7,756,759 | B1 | 7/2010 | Emery et al. |
| 7,844,919 | B1 | 11/2010 | Gupta et al. |
| 7,882,057 | B1 | 2/2011 | Little et al. |
| 7,953,779 | B1 * | 5/2011 | Ragusa ............ G06F 17/30994 707/956 |
| 8,805,825 | B1 | 8/2014 | Showers et al. |
| 2002/0133392 | A1 | 9/2002 | Angel et al. |
| 2009/0006452 | A1 | 1/2009 | Grechanik |
| 2010/0204970 | A1 | 8/2010 | Loomans et al. |
| 2011/0098835 | A1 | 4/2011 | Yucel et al. |
| 2011/0098837 | A1 | 4/2011 | Yucel et al. |

OTHER PUBLICATIONS

Versata Development Group, Inc.; Patent Issued for Configuration Representation and Modeling Using Configuration Spaces, Journal of Transportation (Feb. 23, 2013): 262. 2 pages, downloaded from ProQUestDIrect on the Internet on Oct. 9, 2015.*

* cited by examiner

| | 310 | | 320 | | | 330 | | 340 |
|---|---|---|---|---|---|---|---|---|
| Paint.Red | Paint.White | Paint.Blue | CabStyle.Regular | CabStyle.Super | CabStyle.Crew | InteriorTrim.Cloth | InteriorTrim.Leather | Number of Configs |
| 1 | 1 | 1 | 0 | 1 | 1 | 0 | 1 | 6 |
| 1 | 1 | 1 | 0 | 0 | 1 | 1 | 0 | 3 |
| 1 | 1 | 0 | 1 | 1 | 0 | 1 | 0 | 4 |

Figure 7

| Rule Type | Logical Rules |
|---|---|
| Family: | $A_1 \vee A_2 \leftrightarrow 1$ |
| | $B_1 \vee B_2 \vee B_3 \leftrightarrow 1$ |
| | $C_1 \vee C_2 \vee C_3 \leftrightarrow 1$ |
| | $D_1 \vee D_2 \vee D_3 \leftrightarrow 1$ |
| | $E_1 \vee E_2 \leftrightarrow 1$ |
| Usage: | $A_1 \rightarrow 1$ |
| | $A_2 \rightarrow B_3 \wedge C_2 \wedge E_2$ |
| | $B_1 \rightarrow C_1 \wedge D_1$ |
| | $B_2 \rightarrow C_2$ |
| | $B_3 \rightarrow C_2 \wedge (D_1 \vee D_2)$ |
| | $B_3 \rightarrow C_3 \wedge (D_1 \vee D_2)$ |
| | $B_3 \rightarrow C_3 \wedge D_3 \wedge E_1$ |
| | $C_1 \rightarrow 1, C_2 \rightarrow 1, C_3 \rightarrow 1$ |
| | $D_1 \rightarrow 1, D_2 \rightarrow 1, D_3 \rightarrow 1$ |
| | $E_1 \rightarrow 1, E_2 \rightarrow 1$ |
| Restriction: | $B_2 \wedge E_2 \leftrightarrow 0$ |
| | $B_3 \wedge C_3 \wedge D_2 \wedge E_2 \leftrightarrow 0$ |

Figure 8

| | | |
|---|---|---|
| 410 — | $B_2 \wedge E_2 \leftrightarrow 0 \Rightarrow$ | $B_1 \vee B_3 \rightarrow 1$    430<br>$B_2 \rightarrow E_1$ |
| 420 — | $B_3 \wedge C_3 \wedge D_2 \wedge E_2 \leftrightarrow 0 \Rightarrow$ | $B_1 \vee B_2 \rightarrow 1$    440<br>$B_3 \rightarrow C_1 \vee C_2$<br>$B_3 \rightarrow C_3 \wedge (D_1 \vee D_3)$<br>$B_3 \rightarrow C_3 \wedge D_2 \wedge E_1$ |

Set $D_j^h = G_j^h \cup F_j \equiv$ all feature families in availability rule $h$ associated with left-hand-side feature family $j$, including feature family $j$
Set $p_j^h = 1$, a vector of all 1's representing all features in all feature families
for each feature family $k$ in $D_j^h$, do
    Set $D_{j,k}^h \equiv$ subset of features from family $k$ which are active in the availability rule
    for each feature $d_{j,k,i}^h$ not in $D_{j,k}^h$, do
        $p_{j,k,i}^h = 0$
    end for
end for
return $p_j^h$

Set $D_j^h = G_j^h \cup F_j \equiv$ all feature families in availability rule $h$ associated with left-hand-side feature family $j$, including feature family $j$
Set $p_j^h = 1$, a vector of all 1's representing all features in all feature families
for each feature family $k$ in $D_j^h$, do
    Set $D_{j,k}^h \equiv$ subset of features from family $k$ which are active in the availability rule
    set the sub-vector $p_j^h = 0$
    for each feature $d_{j,k,i}^h$ not in $D_{j,k}^h$, do
        $p_{j,k,i}^h = 1$
    end for
end for
return $p_j^h$

```
Set G_h^k ≡ all feature families in restriction rule h, sorted in reverse DAG order
Set indicator variable l = 0 indicating no feature family specified
Initialize a temporary binary vector q_h^k = 1
for each feature family k in G_h^k, do
    Set vector q_h^k = q_h^l
    if l ≠ 0, then
        complement subvector q_{h,l}^k; q_{h,l}^k = ¬q_{h,l}^k
    end if
    Set G_{h,k}^k ≡ subset of feature family k which are active in the restriction rule
    for each feature g_{h,j}^k in G_{h,k}^k, do
        set q_{h,j}^k = 0
    end for
    Set l = k
end for
return all vectors q_h^k for k ≠ 0
```

Figure 12

| Id | $A_1A_2$ | $B_1B_2B_3$ | $C_1C_2C_3$ | $D_1D_2D_3$ | $E_1E_2$ | Rule |
|---|---|---|---|---|---|---|
| $p_B^1$ | 11 | 100 | 100 | 100 | 11 | $B_1 \rightarrow C_1 \wedge D_1$ |
| $p_B^2$ | 11 | 010 | 010 | 111 | 11 | $B_2 \rightarrow C_2$ |
| $p_B^3$ | 11 | 001 | 010 | 110 | 11 | $B_3 \rightarrow C_2 \wedge (D_1 \vee D_2)$ |
| $p_B^4$ | 11 | 001 | 001 | 110 | 11 | $B_3 \rightarrow C_3 \wedge (D_1 \vee D_2)$ |
| $p_B^5$ | 11 | 001 | 001 | 001 | 10 | $B_3 \rightarrow C_3 \wedge D_3 \wedge E_1$ |
| $p_A^1$ | 10 | 111 | 111 | 111 | 11 | $A_1 \rightarrow 1$ |
| $p_A^2$ | 01 | 001 | 010 | 111 | 01 | $A_2 \rightarrow B_3 \wedge C_2 \wedge E_2$ |

Figure 13

| id | $A_1A_2$ | $B_1B_2B_3$ | $C_1C_2C_3$ | $D_1D_2D_3$ | $E_1E_2$ | Equivalent Availability Rule |
|---|---|---|---|---|---|---|
| $q_1^B$ | 11 | 101 | 111 | 111 | 11 | $B_1 \vee B_3 \rightarrow 1$ |
| $q_1^E$ | 11 | 010 | 111 | 111 | 10 | $B_2 \rightarrow E_1$ |
| $q_2^B$ | 11 | 110 | 111 | 111 | 11 | $B_1 \vee B_2 \rightarrow 1$ |
| $q_2^C$ | 11 | 001 | 110 | 111 | 11 | $B_3 \rightarrow C_1 \vee C_2$ |
| $q_2^D$ | 11 | 001 | 001 | 101 | 11 | $B_3 \rightarrow C_3 \wedge (D_1 \vee D_3)$ |
| $q_2^E$ | 11 | 001 | 001 | 010 | 10 | $B_3 \rightarrow C_3 \wedge D_2 \wedge E_1$ |

Figure 14

```
{Starting with a matrix P, the following compresses on the j^th feature family}
Initial hash map H_j
Initialize P_j' to be empty
{Construct the j-family-mask vector}
Set x_j = 1 {the universal super-configuration}
Set x_{j,j} = 0 {setting the x_j elements to 0 for member of family j}
for each super-configuration s_k in P, do
    Set s_k^{~j} = s_k ∧ x_j
    if s_k^{~j} is not a key in H_j, then
        Set H_j{s_k^{~j}} = s_{k,j}
    else
        Set H_j{s_k^{~j}} = H_j{s_k^{~j}} ∨ s_{k,j} (Replace existing value of H_j{s_k^{~j}} with the logical-or of the hash value and s_{k,j}
    end if
end for
for each key s_x^{~j} in H_j, do
    Set s_g = s_x^{~j}
    Set s_{g,j} = H_j{s_x^{~j}}
    Add s_g to P_j'
end for
Return P_j'
```

Figure 15

| Id | $A_1$ | $A_2$ | $B_1$ | $B_2$ | $B_3$ | $C_1$ | $C_2$ | $C_3$ | $D_1$ | $D_2$ | $D_3$ | $E_1$ | $E_2$ | Rule |
|---|---|---|---|---|---|---|---|---|---|---|---|---|---|---|
| $p_B^1$ | 1 | 1 | 1 | 0 | 0 | 1 | 0 | 0 | 1 | 0 | 0 | 1 | 1 | $B_1 \to C_1 \land D_1$ |
| $p_B^2$ | 1 | 1 | 0 | 1 | 0 | 0 | 1 | 0 | 1 | 1 | 1 | 1 | 1 | $B_2 \to C_2$ |
| $p_B^3$ | 1 | 1 | 0 | 0 | 1 | 0 | 1 | 1 | 1 | 1 | 0 | 1 | 1 | $B_3 \to (C_2 \lor C_3) \land (D_1 \lor D_2)$ |
| $p_B^4$ | 1 | 1 | 0 | 0 | 1 | 0 | 0 | 1 | 0 | 0 | 1 | 1 | 0 | $B_3 \to C_3 \land D_3 \land E_1$ |
| $p_A^1$ | 1 | 0 | 1 | 1 | 1 | 1 | 1 | 1 | 1 | 1 | 1 | 1 | 1 | $A_1 \to 1$ |
| $p_A^2$ | 0 | 1 | 0 | 0 | 1 | 0 | 1 | 0 | 1 | 1 | 1 | 0 | 1 | $A_2 \to B_3 \land C_2 \land E_2$ |

Figure 16

| ID | $A_1A_2$ | $B_1B_2B_3$ | $C_1C_2$ |
|---|---|---|---|
| $r_1$ | 10 | 100 | 10 |
| $r_2$ | 10 | 001 | 11 |
| $r_3$ | 01 | 010 | 10 |
| $i_{1,2} = r_1 \land r_2$ | 10 | 000 | 10 |
| $i_{1,3} = r_1 \land r_3$ | 00 | 000 | 10 |
| $i_{2,3} = r_2 \land r_3$ | 00 | 000 | 10 |

Figure 17

```
Initialize X to all feature families in P that are non-trivial
(a trivial feature family is one which has entries of 1 everywhere in P)
Initialize Y to an empty set (Y will contain the identified set of deterministic feature families)
for each non-trivially active feature family F_h in X do
    if F_h is sparse, then
        Add F_h to Y
    end if
end for
if Y is empty then
    Return NULL
end if
Initialize hash map V
Set k = 0 (Number of unique patterns of feature family interactions)
for i = 1 to N_2 - 1, do
    (N_2 is the number of rows in super-configuration matrix)
    for j = i + 1 to N_2, do
        Increment k
        Intersect two super-configurations: u = P_i ∧ P_j
        Initialize bit-string v to zeros (Length of v is number of feature families in P)
        for each feature family F_h in X, do
            if Σ_{m∈F_h} u_{h,m} > 0, then
                Set v_h = 1 (Overlap in feature family F_h detected)
            else
                Set v_h = 0 (No overlap in feature family F_h)
            end if
        end for
        if V(v) does not exist, then
            Set V(v) = count of zero's (i.e., inactive families) in v
            for each feature family F_m in Y, do
                Set oflag=1
                for each feature family F_h in X, F_h ≠ F_m, do
                    if v_h = 0, then
                        Set oflag=0 (no overlap condition detected for family F_m)
                        Last (Exit for loop)
                    end if
                end for
                if oflag = 1, then
                    (If oflag was not reset to 0 for at least one feature family, then there is overlap in F_m)
                    Remove feature family F_m from Y
                    if Y is empty, then
                        Return NULL (No deterministic feature families found)
                    end if
                end if
            end for
        else
            {V(v) already exists}
            Decrement k
        end if
    end for
end for
(One or more deterministic families have been identified in Y)
Return Y, X, V
(Contents of Y, X, V will be used to find determinant feature families)
```

Figure 18

| ID | $A_1A_2A_3A_4$ | $B_1B_2B_3$ | $C_1C_2$ | $D_1D_2$ |
|---|---|---|---|---|
| $r_1$ | 1000 | 100 | 10 | 10 |
| $r_2$ | 0100 | 100 | 01 | 11 |
| $r_3$ | 0010 | 010 | 10 | 11 |
| $r_4$ | 0001 | 010 | 01 | 01 |
| $r_5$ | 1000 | 001 | 11 | 11 |

Figure 19

```
{We begin with a list of deterministic feature families F, a list of potential determinant families X, and hash map V}
{The keys of V contain unique patterns of activity for feature families in X; the corresponding values are counts of the
number of inactive families in the corresponding keys.}
for each feature family F_k in F, do
    Sort hash map V in ascending order of its values (values are counts of inactive families)
    Initialize X_k to be empty
    for each key v of hash map V, do
        if v_k = 0, then
            {Only consider patterns of interaction where there is no overlap in F_k}
            Set Identified = FALSE
            for each feature family F_i in X_k, F_i ≠ F_k, do
                if v_i = 0, then
                    {F_i has already been found to be a determinant}
                    Set Identified = TRUE
                    Exit for F_i loop (no other family needed for this pattern, go to next key)
                end if
            end for
        end if
        if Identified = FALSE, then
            {must identify one other inactive family}
            for each feature family F_i in X ⊕ X_k, F_i ≠ F_k, do
                {⊕ denotes the bit-wise exclusive-or operation}
                {Only consider those feature families in X but not in X_k ∨ F_k}
                if v_i = 0, then
                    Add F_i to X_k (F_i is a determinant)
                    Exit for F_i loop (only need to identify one inactive family)
                end if
                {In case of multiple possible determinants, we can apply additional logic to arbitrate, e.g.,
                priorities on basis of number of features within the family, or priorities on those families which
                have been identified as being optional.}
            end for
        end if
    end for
end for
Return all sets of all determinants X_k
```

Figure 20

| Interaction | $A_1A_2A_3A_4$ | $B_1B_2B_3$ | $C_1C_2$ | $D_1D_2$ | A | B | C | D | # of Inactive Families |
|---|---|---|---|---|---|---|---|---|---|
| $i_{1,2} = r_1 \wedge r_2$ | 0000 | 100 | 00 | 10 | 0 | 1 | 0 | 1 | 2 |
| $i_{1,3} = r_1 \wedge r_3$ | 0000 | 000 | 10 | 10 | 0 | 0 | 1 | 1 | 2 |
| $i_{1,4} = r_1 \wedge r_4$ | 0000 | 000 | 00 | 00 | 0 | 0 | 0 | 0 | 4 |
| $i_{1,5} = r_1 \wedge r_5$ | 1000 | 000 | 10 | 10 | 1 | 0 | 1 | 1 | 1 |
| $i_{2,3} = r_2 \wedge r_3$ | 0000 | 000 | 00 | 11 | 0 | 0 | 0 | 1 | 3 |
| $i_{2,4} = r_2 \wedge r_4$ | 0000 | 000 | 01 | 01 | 0 | 0 | 1 | 1 | 2 |
| $i_{2,5} = r_2 \wedge r_5$ | 0000 | 000 | 01 | 11 | 0 | 0 | 1 | 1 | 2 |
| $i_{3,4} = r_3 \wedge r_4$ | 0000 | 000 | 00 | 00 | 0 | 0 | 0 | 0 | 4 |
| $i_{3,5} = r_3 \wedge r_5$ | 0000 | 000 | 00 | 00 | 0 | 0 | 0 | 0 | 4 |
| $i_{4,5} = r_4 \wedge r_5$ | 0000 | 000 | 01 | 01 | 0 | 0 | 1 | 1 | 2 |

Figure 21

| Interaction | A | B | C | D | # of Inactive Families |
|---|---|---|---|---|---|
| $i_{1,2}$ | 0 | 1 | 0 | 1 | 2 |
| $i_{1,3}$ | 0 | 0 | 1 | 1 | 2 |
| $i_{2,3}$ | 0 | 0 | 0 | 1 | 3 |
| $i_{1,4}$ | 0 | 0 | 0 | 0 | 4 |

Figure 22

| Id | $A_1A_2$ | $B_1B_2B_3$ | $C_1C_2C_3$ | $D_1D_2D_3$ | $E_1E_2$ | $F_1F_2F_3$ | Rule |
|---|---|---|---|---|---|---|---|
| $p_A^1$ | 10 | 111 | 111 | 111 | 11 | 111 | $A_1 \to 1$ |
| $p_A^2$ | 01 | 001 | 010 | 111 | 01 | 111 | $A_2 \to B_3 \wedge C_2 \wedge E_2$ |
| $d_A^1$ | 10 | 111 | 111 | 111 | 11 | 101 | $A_1 \to F_1 \vee F_3$ |
| $d_A^2$ | 01 | 111 | 111 | 111 | 11 | 010 | $A_2 \to F_2$ |
| $d_E^1$ | 11 | 111 | 111 | 111 | 10 | 100 | $E_1 \to F_1$ |
| $d_E^2$ | 11 | 111 | 111 | 111 | 01 | 011 | $E_2 \to F_2 \vee F_3$ |

Figure 23

| Operation | $A_1A_2$ | $B_1B_2B_3$ | $C_1C_2C_3$ | $D_1D_2D_3$ | $E_1E_2$ | $F_1F_2F_3$ |
|---|---|---|---|---|---|---|
| $p_A^1 \wedge d_A^1$ | 10 | 111 | 111 | 111 | 11 | 101 |
| $p_A^2 \wedge d_A^2$ | 01 | 001 | 010 | 111 | 01 | 010 |

Figure 24

| Operation | $A_1A_2$ | $B_1B_2B_3$ | $C_1C_2C_3$ | $D_1D_2D_3$ | $E_1E_2$ | $F_1F_2F_3$ |
|---|---|---|---|---|---|---|
| $p_A^1 \wedge d_A^1 \wedge d_E^1$ | 10 | 111 | 111 | 111 | 10 | 100 |
| $p_A^1 \wedge d_A^1 \wedge d_E^2$ | 10 | 111 | 111 | 111 | 01 | 001 |
| $p_A^2 \wedge d_A^2 \wedge d_E^2$ | 01 | 001 | 010 | 111 | 01 | 010 |

Figure 25

| Operation | $A_1A_2$ | $B_1B_2B_3$ | $C_1C_2C_3$ | $D_1D_2D_3$ | $E_1E_2$ | Result ID |
|---|---|---|---|---|---|---|
| $p_B^1 \wedge q_1^B$ | 11 | 100 | 100 | 100 | 11 | $t_1^2$ |
| $p_B^1 \wedge q_1^C$ | 11 | 000 | 100 | 100 | 10 | |
| $p_B^2 \wedge q_1^B$ | 11 | 000 | 010 | 111 | 11 | |
| $p_B^2 \wedge q_1^C$ | 11 | 010 | 010 | 111 | 10 | $t_2^2$ |
| $p_B^3 \wedge q_1^B$ | 11 | 001 | 011 | 110 | 11 | $t_3^2$ |
| $p_B^3 \wedge q_1^C$ | 11 | 000 | 011 | 110 | 10 | |
| $p_B^4 \wedge q_1^B$ | 11 | 001 | 001 | 001 | 10 | $t_4^2$ |
| $p_B^4 \wedge q_1^C$ | 11 | 000 | 001 | 001 | 10 | |

Figure 28

| Operation | $A_1A_2$ | $B_1B_2B_3$ | $C_1C_2C_3$ | $D_1D_2D_3$ | $E_1E_2$ | Result ID |
|---|---|---|---|---|---|---|
| $r_1^2 \wedge q_2^B$ | 11 | 100 | 100 | 100 | 11 | $t_1^3$ |
| $r_1^2 \wedge q_2^C$ | 11 | 000 | 100 | 100 | 11 | |
| $r_1^2 \wedge q_2^D$ | 11 | 000 | 000 | 100 | 11 | |
| $r_1^2 \wedge q_2^E$ | 11 | 000 | 000 | 000 | 10 | |
| $r_2^2 \wedge q_2^B$ | 11 | 010 | 010 | 111 | 10 | $t_2^3$ |
| $r_2^2 \wedge q_2^C$ | 11 | 000 | 010 | 111 | 10 | |
| $r_2^2 \wedge q_2^D$ | 11 | 000 | 000 | 101 | 10 | |
| $r_2^2 \wedge q_2^E$ | 11 | 000 | 000 | 010 | 10 | |
| $r_3^2 \wedge q_2^B$ | 11 | 000 | 011 | 110 | 11 | |
| $r_3^2 \wedge q_2^C$ | 11 | 001 | 010 | 110 | 11 | $t_3^3$ |
| $r_3^2 \wedge q_2^D$ | 11 | 001 | 001 | 100 | 11 | $t_4^3$ |
| $r_3^2 \wedge q_2^E$ | 11 | 001 | 001 | 010 | 10 | $t_5^3$ |
| $r_4^2 \wedge q_2^C$ | 11 | 000 | 001 | 001 | 10 | |
| $r_4^2 \wedge q_2^D$ | 11 | 001 | 000 | 001 | 10 | |
| $r_4^2 \wedge q_2^B$ | 11 | 001 | 001 | 001 | 10 | $t_6^3$ |
| $r_4^2 \wedge q_2^E$ | 11 | 001 | 001 | 000 | 10 | |

Figure 29

| Operation | $A_1A_2$ | $B_1B_2B_3$ | $C_1C_2C_3$ | $D_1D_2D_3$ | $E_1E_2$ | Result ID |
|---|---|---|---|---|---|---|
| $t_1^3$ | 11 | 100 | 100 | 100 | 11 | $r_1^3$ |
| $t_2^3$ | 11 | 010 | 010 | 111 | 10 | $r_2^3$ |
| $t_3^3$ | 11 | 001 | 010 | 110 | 11 | $r_3^3$ |
| $t_4^3$ | 11 | 001 | 001 | 100 | 11 | $r_4^3$ |
| $t_5^3 \vee t_6^3$ | 11 | 001 | 001 | 011 | 10 | $r_5^3$ |

Figure 30

| Operation | $A_1A_2$ | $B_1B_2B_3$ | $C_1C_2C_3$ | $D_1D_2D_3$ | $E_1E_2$ | Result ID |
|---|---|---|---|---|---|---|
| $r_1^3 \wedge p_A^1$ | 10 | 100 | 100 | 100 | 11 | $t_1^4$ |
| $r_1^3 \wedge p_A^2$ | 01 | 000 | 000 | 100 | 01 | |
| $r_2^3 \wedge p_A^1$ | 10 | 010 | 010 | 111 | 10 | $t_2^4$ |
| $r_2^3 \wedge p_A^2$ | 01 | 000 | 010 | 111 | 00 | |
| $r_3^3 \wedge p_A^1$ | 10 | 001 | 010 | 110 | 11 | $t_3^4$ |
| $r_3^3 \wedge p_A^2$ | 01 | 001 | 010 | 110 | 01 | $t_4^4$ |
| $r_4^3 \wedge p_A^1$ | 10 | 001 | 001 | 100 | 11 | $t_5^4$ |
| $r_4^3 \wedge p_A^2$ | 01 | 001 | 000 | 100 | 01 | |
| $r_5^3 \wedge p_A^1$ | 10 | 001 | 001 | 011 | 10 | $t_6^4$ |
| $r_5^3 \wedge p_A^2$ | 01 | 001 | 000 | 011 | 00 | |

Figure 31

| ID | $A_1A_2$ | $B_1B_2B_3$ | $C_1C_2C_3$ | $D_1D_2D_3$ | $E_1E_2$ | Number of Configurations |
|---|---|---|---|---|---|---|
| $r_1^4$ | 10 | 100 | 100 | 100 | 11 | 2 |
| $r_2^4$ | 10 | 010 | 010 | 111 | 10 | 3 |
| $r_3^4$ | 10 | 001 | 010 | 110 | 11 | 4 |
| $r_4^4$ | 01 | 001 | 010 | 110 | 01 | 2 |
| $r_5^4$ | 10 | 001 | 001 | 100 | 11 | 2 |
| $r_6^4$ | 10 | 001 | 001 | 011 | 10 | 2 |

Figure 32

```
Initialize queue Q with all super-configurations in the matrix
Initialize result matrix R as an empty matrix
while Queue Q is not empty, do
    Remove first element from the queue Q and set as s_h
    Set counter k = 1, limit K = size of queue Q, flag discardH = false
    (Compare s_h with all other s_k super-configurations currently in the queue)
    while k <= K and discardH = false, do
        Remove first element from the queue and set as s_k
        Set u_{h,k} = s_h ∧ s_k
        if u_{h,k} is not a valid super-configuration, then
            (No overlap exists between s_h and s_k)
            Add s_k to end of queue Q
        else if s_h = u_{h,k}, then
            (Discard s_h because it is contained in s_k)
            Add s_k to end of queue Q
            Set flag discardH = true
        else if s_k = u_{h,k}, then
            (Discard s_k because it is contained in s_h)
            (It's already been removed from the queue, no further action required)
        else
            (Overlap exists. Remove overlap from s_k)
            Set v_g = s_k ⊕ u_{h,k}, where ⊕ is the XOR operator
            Set counter j = 1, limit N_j = number of active families in v_g
            Set x_g^0 = 1, the universal super-configuration
            while j <= N_j do
                (Start with prior super-configuration from the previous loop)
                Initialize x_g^j = x_g^{j-1}
                if j ≠ 1, then
                    (Complement the previously processed active feature family sub-vector)
                    Set x_{g,j-1}^j = ¬x_{g,j-1}^j
                end if
                x_{g,j}^j = v_{g,j}
                Add new super-configuration s_g = s_k ∧ x_g to end of queue Q
                Increment counter j = j + 1
            end while
        end if
        Increment counter k = k + 1
    end while
    (s_h no longer overlaps with any s_k in queue Q)
    Add s_h to result matrix R
end while
```

Figure 33

METHOD AND SYSTEM FOR GENERATING A GLOBAL REPRESENTATION OF A PRODUCT DEFINITION

CROSS-REFERENCE TO RELATED APPLICATIONS

This application is a continuation of U.S. application Ser. No. 13/840,497 filed Mar. 15, 2013, now U.S. Pat. No. 9,098,854 issued Aug. 4, 2015.

TECHNICAL FIELD

Embodiments of the present invention relate generally to methods and systems for generating a global representation of a product definition.

BACKGROUND

Traditional product configuration systems determine the validity of a product configuration based on the compatibility of the various components or sub-systems that a particular product may comprise. Such systems guide and/or validate the product selection process in a "bottom-up" approach by applying rules or constraints defining component or sub-system interrelationships as those components or sub-systems. These rules and constraints may be defined, organized and/or applied in a hierarchical fashion.

For complex systems in which there is a wide selection of possible product configurations involving potentially hundreds or thousands of components or sub-systems, the volume of rules and constraints that must be defined, and then applied during the configuration and selection process, can materially impact the performance of the system and the efficiency of the process overall. In addition, a large volume of interrelationship rules and constraints increases the possibility of error in the rule/constraint definition process. Finally, this approach makes product definition a labor intensive and overly complex process because inter-component compatibility must be defined for each component or sub-system in the product. This increases the complexity of implementing changes among components, or to component compatibility, within the configuration system.

U.S. Pat. No. 5,515,524, presently assigned to Versata Development Group, Inc., discloses a constraint-based configuration system that uses a functional hierarchy to generate structural relationships and other physical interconnections between components that may make up a configuration. The structural hierarchy model includes the Component, Composite, Container, Port, and Connector base classes. These base classes may branch into derived classes (i.e., system-specific classes) and terminate at leaf-descendants. Leaf-descendants define the type of components in the functional, structural hierarchy model. Attributes, data types, resources, and constraints further define the model. The structural hierarchy includes a container structure to specify that one component is contained by, or in, another component. In addition, the structural specification provides the ability to specify the connections between components of a configured system. As components are added to a configuration, the physical and logical interconnections that are required to assemble the system components may be verified.

U.S. Pat. No. 5,825,651, presently assigned to Versata Development Group, Inc., discloses a "drag and drop" configuration system. The system operates based on a product definition defining the interrelationships between the parts or components that may make up a product. A maintenance system is provided for specifying the part relationships. Part-to-part relationships may be created between parts within a product. Parts in a product definition may be related or classified as included, required choice, excluded, removed and optional. Similar parts may grouped together to form a part hierarchy.

Embodiments of the invention described herein provide a different and more efficient approach to product configuration. Unlike prior art systems the present disclosure describes exemplary embodiments to validate a product configuration selection against the matrix of valid end-product configurations themselves. With this architecture, efficiency and flexibility may also be achieved with system deployment configurations and resolving invalid selections in the configuration process.

SUMMARY

One or more embodiments include a computer-implemented method or system for generating a global representation of a product definition from one or more a local, rule-based representations of the product definition. The method or system receiving a product definition that includes a feature family having data defining one or more product features. The product definition including one or more corresponding rules defining one or more relationships between one or more product features. The method or system receiving input selecting one or more feature families of interest. The method or system identifying the one or more rules that provide a relationship connecting the one or more feature families to the selected feature families of interest. The method or system converting the identified rules to one or more positive logic rule groups. The method or system generating one or more global representations of the product definition by interacting the one or more positive logic rule groups to produce a result that defines the relationship between the interacted positive logic rule groups and storing the results that is determined as being valid.

These and other aspects will be better understood in view of the attached drawings and the following detailed description.

BRIEF DESCRIPTION OF THE DRAWINGS

FIG. 4 illustrates another non-limiting table according to one embodiment;

FIG. 5 illustrates another non-limiting table according to one embodiment;

FIG. 6 illustrates another non-limiting table according to one embodiment;

FIG. 7 illustrates another non-limiting table according to one embodiment;

FIG. 8 illustrates another non-limiting table according to one embodiment;

FIG. 9 illustrates another non-limiting table according to one embodiment;

FIG. 10 illustrates a non-limiting pseudo-code according to one embodiment;

FIG. 11 illustrates another non-limiting pseudo-code according to one embodiment;

FIG. 12 illustrates another non-limiting pseudo-code according to one embodiment;

FIG. 13 illustrates another non-limiting table according to one embodiment;

FIG. 14 illustrates another non-limiting table according to one embodiment;

FIG. 15 illustrates another non-limiting pseudo-code according to one embodiment;

FIG. 16 illustrates another non-limiting table according to one embodiment;

FIG. 17 illustrates another non-limiting table according to one embodiment;

FIG. 18 illustrates another non-limiting pseudo-code according to one embodiment;

FIG. 19 illustrates another non-limiting table according to one embodiment;

FIG. 20 illustrates another non-limiting pseudo-code according to one embodiment;

FIG. 21 illustrates another non-limiting table according to one embodiment;

FIG. 22 illustrates another non-limiting table according to one embodiment;

FIG. 23 illustrates another non-limiting table according to one embodiment;

FIG. 24 illustrates another non-limiting table according to one embodiment;

FIG. 25 illustrates another non-limiting table according to one embodiment;

FIG. 28 illustrates another non-limiting table according to one embodiment;

FIG. 29 illustrates another non-limiting table according to one embodiment;

FIG. 30 illustrates another non-limiting table according to one embodiment;

FIG. 31 illustrates another non-limiting table according to one embodiment;

FIG. 32 illustrates another non-limiting table according to one embodiment;

FIG. 33 illustrates another non-limiting pseudo-code according to one embodiment;

DETAILED DESCRIPTION

Figure 1:
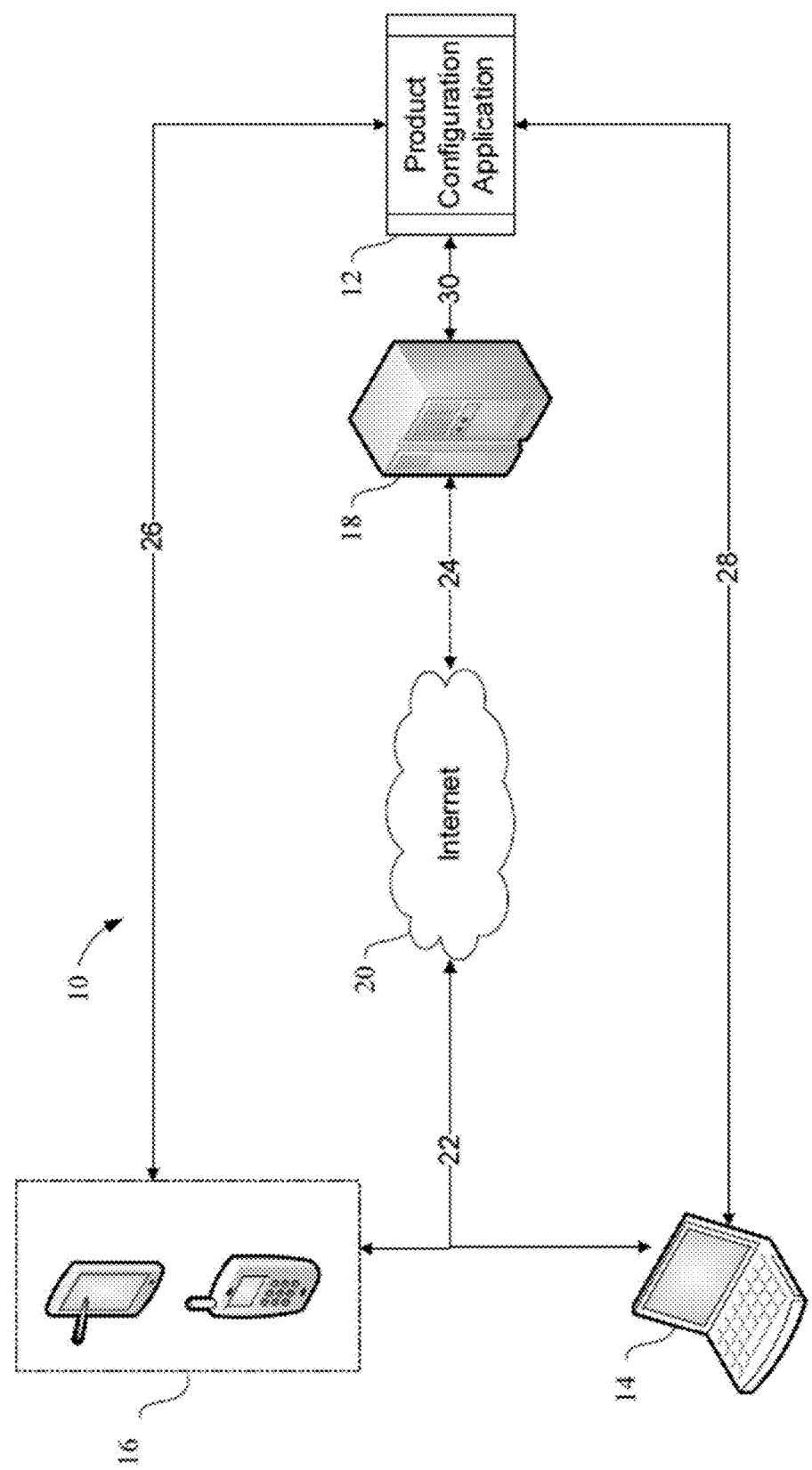
FIG. 1 illustrates is a block topology illustrating a non-limiting configuration of the system for generating a global representation.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A product definition application may allow the user to select options or features to create or modify a configuration. When a user changes a configuration by adding or removing a feature, the configurator may validate the new configuration. If the new configuration is invalid, the configurator may prompt the user to modify the selection, propose a selection that will result in a valid product configuration, or make the necessary changes to the existing selection. To perform this validation, the product definition application may determine if the selected configuration fits within the allowed product space, as described in greater detail below.

The application may run on a client device, such as (and without limitation), a personal computer or a nomadic device such as a mobile phone, with available resources. Other non-limiting examples may include a smartphone, tablet computer, or other portable device. The client device may include a microprocessor and volatile or non-volatile computer storage medium, including, but not limited to, Flash memory, EEPROM, RAM, DRAM, hard disk drives, solid state drives or optical drives. The computer storage medium may also be an external form of computer storage medium, including, but not limited to, External flash or hard drives, or remote (e.g., "cloud") storage devices. However, it is further contemplated that the product definition application may be loaded and run from a server terminal from which a personal computer or nomadic device could connect. It is contemplated that the server terminal would also include a microprocessor and volatile or non-volatile computer storage medium, such as that used on the client device. It is also desirable to minimize the amount of data that is transferred between the application server and the application client.

In one embodiment, the product definition application uses a numerical representation of product space or valid product configurations and a set of algorithms to validate a configuration based on the representation. These algorithms may utilize binary-vector logical and algebraic operations, thereby minimizing computational resource consumption, decreasing validation errors, and/or providing improved efficiency in validation processing.

Where a product is made up of one or more feature families containing two or more features, a valid configuration may consist of exactly one feature selected from each feature family. A buildable configuration may be a valid configuration that falls within the allowed product space. If there are no product space restrictions, every configuration may be a valid configuration.

Product configuration may restrict the product space by providing a complete representation of features, or combinations of features, are standard, not available, optional, or excluded. Product definitions may include a list and descriptions of feature families and features, and product configurations.

FIG. 1 illustrates a block topology of a system 10 for product configuration validation in accordance with one non-limiting embodiment of the present invention. The product definition application 12 may be a client application that allows a user to add and remove features of a buildable product to build a valid custom product. The application 12 may allow a user to explore the allowed product space as opposed to what is only available in product inventory. In one non-limiting embodiment, the application 12 may be implemented using AJAX technology (i.e., asynchronous Java Script and XML technology).

The application 12 may be installed and executed from a client terminal, such as a personal computer 14 and/or a nomadic device 16 (e.g., a tablet, a mobile phone, and the like), and/or remotely (e.g., executing on a remote server 18 and accessed and operated via the Internet 20). As non-limiting examples, the application 12 may be deployed as a rich internet application, a smart phone application (e.g., a mobile application) or a standalone application for a personal computer. The device 14, 16 may include a microprocessor and volatile or non-volatile computer storage medium, including, but not limited to, Flash memory, EEPROM, RAM, DRAM, hard disk drives, solid state drives or optical drives. The device 14, 16 may also be an external form of computer storage medium, including, but not limited to, External flash or hard drives, or remote (e.g., "cloud") storage devices. The application 12 may be stored (illustrated generally by arrow 26 and 28) in the memory of the device 14, 16. The microprocessor (not shown) of the device 14, 16 may then execute the application 12 (i.e., execute the algorithm of the application).

The application 12 may alternatively be deployed as web-based application. For example, the application 12 may be implemented as a web application in Java compiled to JavaScript.

The application 12 may further be stored (illustrated generally by arrow 30) on the server 18. The microprocessor (not shown) of the server 18 may then execute the application 12 (i.e., execute the algorithm of the application).

FIG. 1 illustrates at least two embodiments in which the product definition application 12 may be loaded and run. First, the product definition application may be loaded and run on one or more client devices 14, 16. The product definition application 12 may be installed to the client device 14, 16 from a computer-readable storage medium such as (and without limitation) a CD-ROM, DVD or USB thumb drive. Alternatively, the mobile devices 12 may connect to server 18 via connection path 22, 24 using the Internet 20. Finally, the application 12 may be downloaded to the client devices 14, 16 via a wireless technology, such as cellular or Wi-Fi.

As another alternative, the application 12 may be loaded and run on the one or more servers 18 which are in communication with the client terminals 14, 16 via the Internet 20 through communication path 22, 24. In this case, data and operations may be exchanged through connection 22, 24 between the application 12 and the client devices 14, 16 via the Internet 20.

When a product is configured by a user, the user may select a product for configuration. Upon selecting the product, the product definition, and optionally, pricing information, may be downloaded from the server 18 to the client device 14, 16. However, it should again be noted that the product, product definition, and optional pricing information may be loaded on the server 20 and the client devices 14, 16 may connect to the server 18 to access this information. The product definition may also be sent to the client 14, 16 in a compressed structural format. Until the point that the user submits the full configuration back to the server 18, all of the work relating to configuring the product may be performed on the client device 14, 16. The data from the client device 14, 16 may, or may not, be asynchronously transmitted back to the server 18. In one embodiment, all configuration validation and pricing calculations may be performed on the client device 14, 16.

The creation, updating, management and processing of the product definition application 12 may potentially be capable of spanning multiple functions and organizations within a company, including Product Development, Marketing and Sales Operations, Manufacturing, Finance, and Material Planning and Logistics. However, prior product definition applications have required significant processing computational power and also significant media storage space in order to operate. For example, conventional prior product definition applications may be required to operate on server with substantial processing power that could be dedicated solely to the construction and processing of a product definition application. Such a server based application may also require storage systems designed to hold large amounts of data (e.g. terabytes).

Consequently, such prior art product definition applications require significant expenditure in both hardware (e.g., server and tape media storage) and software to operate. Furthermore, the hardware and software systems require trained Information Technologists to maintain the systems that the product definition operates upon, again requiring significant financial expenditure. As such, prior software applications are cost prohibitive.

Because prior product definition applications are typically constrained to operation on server based platforms, they are also neither scalable nor portable to smaller computer platforms (e.g., desktops, laptops, tablets or smart phones). The application 12 may therefore be designed so as to be capable of generating and processing product definitions for all corporate functions that is both scalable and portable across virtually any computer platform.

Prior product definition applications may also not have the processing throughput or storage capability to handle features from more than 5 or 6 feature families that are used across various operations within a company (e.g., Marketing and Sales, Manufacturing, and Finance). Such a limitation may be limited based on the mathematical complexity of codifying the required rules, consistency checking, and rule processing. Prior product definition applications may therefore be performed using multiple servers that are deployed throughout an organization and are used by the multiple operations.

Departing from prior product definition applications, the product definition application 12 of the present disclosure may be designed using a codified series of structured Boolean algebraic rules. Once generated, the operation of the application 12 may process these rules to model local interactions between features from a restricted set of feature families.

While a Boolean algebraic representation of the application 12 may be designed to be compact enough to be scalable and portable to computer systems having less processing power and storage capacity, the product definition must also be design such that it effectively and completely covers the entire space of how features interact. The application 12 should also be designed such that it is capable of processing interactions of all features across all feature families simultaneously. Therefore, the application 12 should be designed such that it provides a configuration-based, or global, representation of product definition that is streamlined and simplified such that it is scalable and portable across multiple corporate processes.

The application 12 that requires complete configurations (i.e., unique and valid combinations of features) should be generated so that it effectively plans for part volumes for a particular product (e.g., an automotive vehicle). The present disclosure contemplates the application 12 may generate and/or use product definition rules which may be processed and manipulated to generate valid configurations. Application 12 can replace prior art applications that have to continually re-solve product definition rule interactions. Application 12 may instead solve the interactions once and use the global representation of valid configurations one or more times until such time as the product definition input changes.

In one non-limiting example, the application 12 may be part of an inventory management system that requires evaluation of explicit configurations for purposes of recommending complete vehicle orders for dealers to replenish inventory. In other non-limiting applications, the application 12 may be designed to generate configurations which are used either at a vehicle dealer computer system (e.g., vehicle dealer ordering system) or through customer computer systems (e.g., laptop, tablet or smart phone) which interface with a Build-and-Price web site (e.g., Ford Motor Company's "Build your own Ford" vehicle website). In these cases, the product definition should be designed such that it determines whether a configuration is consistent with the product definition rules, and potentially determine modifications which would correct a configuration if it violates product definition. Current product definition applications, however, fail to provide the capability within corporate systems to be able to automatically generate configuration-based views of a product definition.

The application 12 should provide the capability of representing product definition both locally and globally such that it enables transformation of product definition authoring and codification processes. Prior product definition applications had restricted individual codifiers to define and author a product definition that describes interactions amongst features from a relatively small (e.g., six or fewer) number of feature families. Such a restriction was generally premised on the fact that it would be difficult for an individual to contemplate feature interactions in a larger space.

The application 12 may be designed to include authoring tools for transforming product definitions from a local representation to a global representation. For example, as local rules are added or modified during the authoring process, the application 12 may operate to check for validity and consistency by converting the local rules into a global representation. Furthermore, by implementing the application 12 using a configuration based representation having global implications of rule changes, deletions or additions can be evaluated using a configuration-based representation.

As a further example, in prior product definition applications, a codifier may unintentionally add a rule that had the unintended effect of restricting a feature to only a few configurations that was intended to be widely available. The application 12 may avoid such an unintended outcome by including a global representation of product definition so that this consequence may be easily detected. Aside from detecting this mistake, the application 12 may also cancel and/or modify the change before subsequent changes to product definition are made.

The present disclosure further contemplates that the application 12 may provide a computationally efficient algorithmic process for generating a compact, distributed, representation of product definition (i.e., a configuration-based representation), augmented by a representation of deterministic relationships between certain features, that is also based on a structured Boolean algebraic representation of the same product definition. One non-limiting advantage of the application 12 is that the global representation may be streamlined or eliminated altogether by the processing of Boolean algebraic rules by downstream systems. The generated global representation may also replace the previously required downstream processing with simple operations that manipulate a distributed representation of product definition. In other words, the application may generate a global representation which provides a pre-solved solution for downstream processing that requires minimal processing power or storage space.

The application 12 may be designed such that it is capable of processing a product definition that may include a combination of features, where the features are chosen from a predetermined set of feature families. The application 12 may further be designed such that each feature may be ascribed to exactly one feature family, and that a given instance of a product may require that it contain one and only one feature from each feature family. The application 12 may therefore be codified to produce a product definition that defines all the ways in which features can be combined into realizable instances of the product.

For example, the application 12 may be designed such that it is capable of processing a product definition that is designed to include the following three feature families: Paint (Red, White and Blue), Cab Style (Regular, Super and Crew), and Interior Trim (Cloth and Leather). If there are no restrictions, (i.e., every feature from one feature family is available with any combination of features from all other feature families), then the application would be able to determine that there is a total of 18 valid configurations (3 Paints×3 Cab Styles×2 Interior Trims). The present disclosure contemplates that any one instance may be understood as being a configuration.

The application 12 may be designed such that the configuration may provide a collection of features which defines partially or completely a "buildable" or "orderable" product (e.g. a vehicle). The application 12 may be designed such that the configuration includes one and only one feature from each feature family. The application 12 may therefore determine that a selection of one feature from a feature family precludes simultaneous selection of another feature from that family in defining a unique configuration. For example, the application 12 may determine that for a valid automotive vehicle configuration the features "cloth" and "leather" interior trims cannot both be simultaneously selected.

With reference to the figures below, details regarding the design and operation of the application 12 will be more fully disclosed. The present disclosure contemplates that the disclosed application 12 may be designed to be both scalable and portable that it may be run on multiple different computer platforms or devices (e.g., server, laptop, tablet, or smart phone) that have differing degrees of processing power and storage capabilities.

Figure 2:
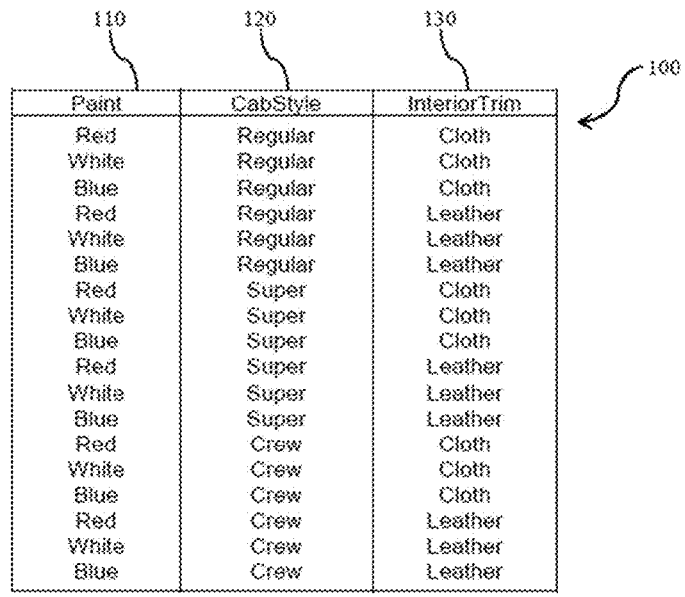
FIG. 2 illustrates a non-limiting table according to one embodiment.

FIG. 2 illustrates a non-limiting catalogue representation 100 for representing three feature families 110, 120, 130 of an automotive vehicle having 18 possible configurations in a tabular form. Each of the 18 configurations are illustrated as representing a unique configuration, however, one or more of the configurations may be non-unique. The three feature families (110, 120, 130) represent the feature family "paint," "cab style," "interior trim". Each feature family (110, 120, 130) may also include individual rows which consist of possible features taken from each of the feature families.

Figure 3:
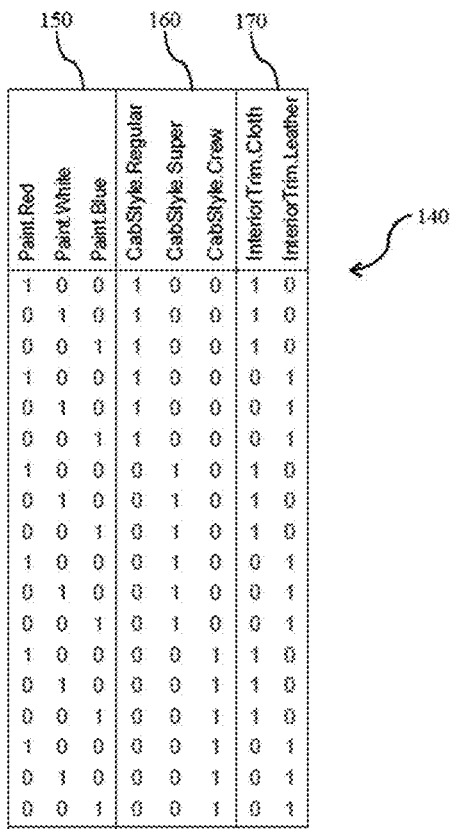
FIG. 3 illustrates another non-limiting table according to one embodiment.

FIG. 3 illustrates an alternative tabular representation (140) of the feature families (150, 160, 170) in a binary matrix fashion. FIG. 2 also illustrates a separate column heading for each unique feature from the binary matrix feature families (150, 160, 170) (e.g. "Paint, Red"). An entry of '1' in any row of the feature families (150, 160, 170) indicates that the feature corresponding to that entry is present in the configuration, whereas an entry of '0' indicates that the corresponding feature is not present in the feature families (150, 160, 170).

Figures 4, 5, 6:
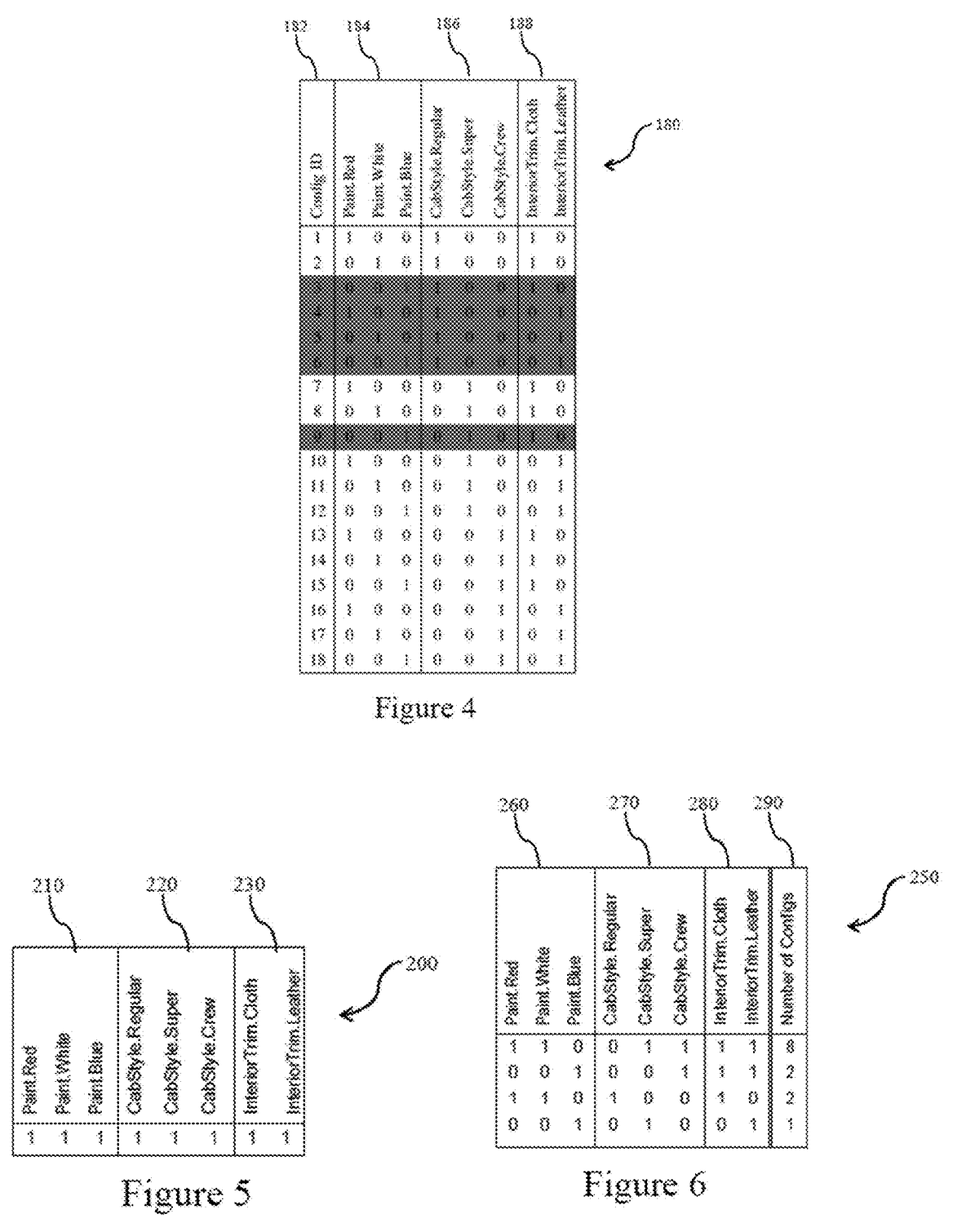

FIG. 4 further illustrates the 18 unique configurations illustrated in the catalogue representation 100 of FIG. 2 in as a binary matrix representation 180 of configurations for each feature family 184, 186, 188. The binary matrix representation 180 illustrated in this non-limiting embodiment indicates that a value of "1" denotes the presence of a feature and the value of "0" denotes the absence of a feature. It is also noted that the sum of entries in within any row (or configuration) may equal 3, which are the total number of feature families for this example.

For simple products, explicit enumeration of all potential configurations may not impose difficulties from a computational perspective. However, vehicular-based products can be defined with on order of 100's of feature families, and these feature families can have up to dozens of possible features. It may be possible to define product definition with an almost immeasurable combination of features. For example, one vehicle definition may have over $10^{20}$ combinations across differing markets. For this reason, complete enumeration of configurations in many real world situations may be impractical, both in terms of constructing the product definition itself, as well as, in using a tabulated representation of configurations in downstream applications and computer platforms.

Accordingly, if the product definition remains simple, the rule-based approach may be achievable, as there are no restriction or requirement rules for consideration. However, in complex product definitions, the explicit representation of configurations may be impractical for product lines with many feature families and features.

The present disclosure contemplates a representation that allows configurations to be expressed in a compact or compressed form, where the complexity of the compressed representation is of the same order as that of the equivalent representation by logical Boolean algebraic rules. In the compressed representation, it may be determined how features from a common feature family can be grouped together, by forming what may be referred to as a super-configuration as disclosed in pending application Ser. No. 13/268,276 which is fully incorporated by reference herein. When two or more features from the same feature family are active within a super-configuration, then the simple interpretation is that any of those features are possible choices in defining a configuration from that super-configuration.

With reference back to the three feature family example of FIG. 2, the super-configuration representation may include a single binary vector, with values of '1' everywhere, implying that features from different feature families can be combined in all ways possible. Such a combined configuration may be called a universal super-configuration. FIG. 5 illustrates one non-limiting example of the result of constructing the universal super-configuration (200) when there may exist no dependencies between each feature within each feature family (210, 220, 230).

The present disclosure further contemplates that the application 12 may incorporate the availability of restrictions or requirements, which may be expressed as rules. For example, a product definition may be restricted in two ways. In one non-limiting automotive vehicular example, a product definition may be established for a pickup truck that is available in a Regular Cab Style, Crew Cab Style and Super Cab Style. Regular Cab Style may only be available with Cloth Interior Trim. Such a product definition may be referred to as an availability rule. In other words, the Regular Cab Style may not be available with Leather Interior Trim, and both a Super and Crew Cab Styles vehicle may be available with either Cloth or Leather Interior Trim.

A restriction rule, on the other hand, may not allow the combination of Blue Paint with Cloth Interior Trim and either Regular or Super Cab Style. FIG. 4 illustrates how the configuration 140 illustrated in FIG. 2 that may be in violation of these rules may be identified so that they could be excluded from the valid product definition. As illustrated, FIG. 4 illustrates the configuration 180 with the enumerated configurations 182 for the three feature families 184, 186, 188 after applying the two exemplary product definition rules. The gray shading illustrated in FIG. 4 indicates those configurations that are in violation of product definition. As illustrated, after the rules are applied and the configurations that are in violation (highlighted in gray) are removed, there are 13 remaining valid configurations.

In this example, the application of Boolean algebraic rules to a pool of all possible configurations permits the capability of trimming the space of configurations. This set of trimmed configurations may only be marginally less complex than the original set of configurations. The present disclosure contemplates that methods may be determined for taking an existing set of configurations and compressing them to an equivalent set of super-configurations.

In one non-limiting example, FIG. 6 illustrates one possible super-configuration representation (250) of a product definition. FIG. 6 illustrates the super configuration representation 250 of the three feature families 260, 270, 280 after application of product definition rules. It is contemplated that the super configurations illustrated may be enumerated as 13 unique configurations as indicated by the sum of the number of configurations 290. It is also contemplated that the super-configuration representation (250) may not be unique.

FIG. 7 illustrates an alternative set of super-configurations (300) which represents the same underlying set of configurations that were illustrated in FIG. 6. FIG. 7 illustrates the alternate super configuration representation 300 of the three feature families 310, 320, 330 after application of product definition rules. However, the alternative super configuration 300 has been condensed even further so that the three feature families 260, 270, 280 have been simplified as a more condensed set of feature families 310, 320, 330. It is contemplated, however, that expanding the configurations (340) still may produce the same 13 configurations that were illustrated in FIG. 6.

With respect to representations of configuration and super-configurations implemented in the application 12, a product may be comprised of features from $N_f$ different feature families. Further, a configuration may include a combination of unique features, one from each of the $N_f$ feature families, which describes a unique instantiation of a product. A configuration may be represented as a binary vector, which itself is a concatenation of a series of sub-vectors, one for each feature family, where each feature family has one and only one feature with a value of unity, and all other features have values of zero. In this example, the sum across all components of all feature families may equal the number of feature families. If the vector $c_k$ represents the $k^{th}$ instance from a set of configurations, then, the sub-vector $c_{k,j}$ may encode the feature values associated with the $j^{th}$ feature family in the $k^{th}$ configuration, where the length of $c_{k,j}$ is equal to the number of features in this feature family, $l_j$. Finally, $c_{k,j,i}$ may be the value associated with the $i^{th}$ feature from feature family j in configuration k. The present disclosure contemplates that $\Sigma_{j=1}^{N_f}\Sigma_{i=1}^{l_j}c_{k,j,i}=N_f$ for all values of k.

Similarly, $s_k$ may denote the $k^{th}$ instance from a matrix of super-configurations. Then, the sub-vector $s_{k,j}$ may corresponds to feature values associated with feature family j for super-configuration k, and $s_{k,j,i}$ corresponds to the $i^{th}$ feature from that sub-vector. Note that $s_k$ is a concatenation of the sub-vectors $s_{k,j}$. In the case of a valid super-configuration representation, at least one feature from a feature family may be active. Further, the number of configurations defined by the $k^{th}$ super-configuration may be given by $\Pi_{j=1}^{N_f}\Sigma_{i=1}^{l_j}s_{k,j,i}$. In the case of a single configuration, the following equation may apply, $\Sigma_{i=1}^{l_j}s_{k,j,i}=1$ for all j, which yields a count of one for the number of configurations. It is therefore noteworthy that any operations that can be performed on super-configurations can also be performed on configurations themselves. The present disclosure contemplates, however, that the converse may not be true.

The application 12 may determine a universal super-configuration to (1) enumerate all possible configurations for a given set of feature families and constituent features, (2) eliminate those configurations that are not consistent with product definition rules, and (3) transform the trimmed set of configurations to a compressed set, typically not unique, of super-configurations. In order to make the application 12 scalable, a process may be needed that does not require explicit enumeration of configurations, and is not computationally prohibitive. In other words, the application 12 may be designed so as to translate a Boolean algebraic representation of product definition to a compact, super-configuration based representation. The present disclosure contemplates that the application 12 may automatically determine the required compact, super-configuration-based representation through such a process.

The present disclosure also discloses a mathematical framework for generically describing usage, restriction and package rules that can define a product. While many different forms of Boolean algebraic product definition rules may be used, each can be converted into availability rules for a uniform, positive logic representation of product definition. The application 12 may be designed to convert restriction and package rules to availability rules, as the super-configuration generation process typically requires a positive logic representation of product definition. The application 12 may also translate binary algebraic availability rules to binary vectors, which encode what may be described as local super-configuration.

The application 12 may efficiently transform Boolean algebraic rules, in the form of local super-configurations, to global super-configurations which represent complete configurations, by compressing non-overlapping super-configurations. A pair of super-configurations may be non-overlapping if they represent unique configurations. The present disclosure contemplates that the application 12 may create a compressed super-configuration representation from a set of unique configurations, or from an intermediate set of non-overlapping super-configurations, or from local super-configuration representations of non-overlapping product rules.

One method for constructing a global representation of product definition may include rule group interaction for two or more groups of super-configurations which may be non-overlapping. The application 12 may process rule group interactions, in such a way that the interaction of two groups of non-overlapping local or global super-configurations may result in a group of super-configurations that are themselves non-overlapping, upon removal of invalid super-configurations. An invalid super-configuration may be determined as being one in which one or more feature families are inactive (i.e. where no feature is active within that family).

Compression of super-configurations can be hindered when feature families that are deterministically related to one another are included in the product definition. Under those conditions, compression may be disabled for those feature families. In order to generate a super-configuration representation that is as compact as possible, it may require identifying those feature families that can be deterministically modeled as a function of other feature families. The application 12 may therefore search for the occurrence of such instances and may also remove the deterministic feature families from consideration when generating super-configurations. The application 12 may also augment the super-configuration representation with local binary matrix representations of deterministic relationships, where the features from those families that are eliminated are modeled as a function of features remaining in the super-configurations themselves.

By using the disclosed application 12, compression, rule interaction and relationship inference, may be implemented for generating a hybrid global super-configuration matrix, augmented with local binary matrices of deterministic relationships, from a Boolean algebraic representation of the product definition. The application 12 may also prune a matrix of super-configurations, where certain feature families may be excluded from the representation either after or as the super-configuration matrix is constructed.

FIG. 8 illustrates a non-limiting example where the application 12 may implement a product definition (350) having five feature families (360), including usage rules (370) and restriction rules (380). The form of the restriction and usage rules (370, 380) may be written in what the present disclosure contemplates as being a logical style. For example, logical-styled product definition rules may be illustrated as using: '0' as empty set; '1' as universal set; '$\leftrightarrow$' as equivalent to; '$\rightarrow$' as available with; '$\vee$' as logical-or; and '$\wedge$' as logical-and.

With reference back to FIG. 8, the restriction and usage rules (370, 380) lists the various features, where $X_j$ denotes the $j^{th}$ feature associated with feature family X. This block formally may state that the individual features completely enumerate all possible features for the respective feature families. The usage rules (370) illustrated in the product definition (350) may have one feature on its left-hand-side, and a multitude of features on the right-hand-side. Features from a common family on the right-hand-side may be combined with a logical-or operator whereas groups of features from different feature families may be combined with a logical-and operator. These usage rules (370) may be structured such that: (1) there is no cyclicality between the feature families in the usage rules, and (2) that there is no overlap between rules for features with a common left-hand-side feature.

For example, one condition may require that if some left-hand-side feature family Y is dependent on some right hand side feature family X, either directly or indirectly through rule chaining, then other rules cannot exist where feature family Y appears on the right-hand-side of a rule with left-hand-side feature family X, either directly or indirectly. Another condition may require that no two usage rules (370) with the same left-hand-side feature can represent an identical combination of features on the right-hand-side.

The application 12 may be designed to include a mathematical framework that may allow determination of a Boolean algebraic representation of product definition in generic terms. When properly designed, the application 12 may also allow subsequent description of the algorithmic processing of the developed usage and restriction rules (370, 380).

In one non-limiting example, a product definition may require the enumeration of feature families as well as the enumeration of individual features associated with these families. $\mathbb{F}$ may denote a set corresponding to $N_f \geq 1$ feature families, with $\mathbb{F} = \{\mathcal{F}_1 \ \mathcal{F}_2 \ \ldots \ \mathcal{F}_{N_j}\}$, where $\mathcal{F}_j$ is itself a set of features associated with the $j^{th}$ feature family (e.g., exterior paint color). Each individual feature family $\mathcal{F}_j$ may be composed of a set of features, given by $\mathcal{F}_j = \{f_{j,1} \ f_{j,2} \ \ldots \ f_{j,l_j}\}$, where $l_j$ is the number of features in feature family $\mathcal{F}_j$. Thus, $\mathbb{F}$ represents all possible features from all families associated with a product.

A variety of Boolean algebraic rule types may also be implemented to allow for a local representation of product definition to be constructed. While all of the various rule types may be converted to rules of a single class, the process for converting usage, restriction and package rules to a common positive logic representation may be referred to as rule flattening.

The application 12 may also include usage rules that are constructed using positive logic. A usage rule may state that some feature from a given feature family is available in combination with one or more subsets of features from one or more different feature families. For example, a product definition may be defined by a set of usage rules, where the rules are organized into groups, such that each group is associated with features from a single feature family which are considered to be available with features from other feature families. The $h^{th}$ rule in the group of usage rules may be associated with feature family $\mathcal{F}_j$. The left-hand-side of a usage rule may consist of a single feature from this feature family (e.g., the $i^{th}$ feature, given by $f_{j,i}$). The right-hand-side of a usage rule may consist of those features which are available for $f_{j,i}$. In this case, the feature families on the right-hand-side of a usage rule may be taken from a proper subset of feature families from the entire universe of feature families, $\mathbb{G}_j^h \subset \mathbb{F}$, where $\mathbb{G}_j^h$ may be any combination of one or more feature families from $\mathbb{F}$ excluding feature family $\mathcal{F}_j$. For the $k^{th}$ feature family in $\mathbb{G}_j^h$, we may have a subset of features given by the set $\mathcal{G}_{j,k}^h$, where $\mathcal{G}_{j,k}^h$ is a proper subset of the features in $\mathcal{F}_k$: $\mathcal{G}_{j,k}^h \subset \mathcal{F}_k$. If $\mathcal{G}_{j,k}^h$ is identical to the set of all features in $\mathcal{F}_k$, then it is unnecessary to include this family in the rule. It is contemplated in one non-limiting example that if $\mathcal{G}_{j,k}^h$ is identical to the set of all features in $\mathcal{F}_k$, then it is unnecessary to include this family in the rule. The individual features in $\mathcal{G}_{j,k}^h$ may be referenced as $g_{j,k,m}^h$.

Given this representation of feature family and feature sets and subsets, the $h^{th}$ rule associated with left-hand-side feature family $\mathcal{F}_j$ may be given by the following equation:

$$f_{j,i} \to \bigwedge_{(\mathcal{G}_{j,k}^h \in \mathbb{G}_j^h)} \left( \bigvee_{(g_{j,k,m}^h \in \mathcal{G}_{j,k}^h)} g_{j,k,m}^h \right) \quad (1)$$

where $\bigvee_{(g_{j,k,m}^h \in \mathcal{G}_{j,k,m}^h)} g_{j,k,m}^h$ is the logical-or of all features in the feature set $\mathcal{G}_{j,k}^h$, where the operation $\bigwedge_{(\mathcal{G}_{j,k}^h \in \mathbb{G}_j^h)}$ takes the logical-"and" across all disjunctions of features from feature families in $\mathbb{G}_j^h$, where $f_{j,i}$ is a feature from a feature family which may not occur on the right-hand-side of the rule, and where the arrow ($\to$) is interpreted as "is available with."

In addition, usage rules of the form $f_{j,i} \leftrightarrow 1$ indicate that the feature $f_{j,i}$ may be available everywhere, where the '1' symbol denotes the universal set. The present disclosure contemplates that any such group of usage rules corresponding to a common left-hand-side feature family are assumed to be non-overlapping (i.e., the rules encode unique combinations of features), which may be verified by an authoring and codification method or system.

The application 12 may also include restriction rules that are constructed using negative logic. A restriction rule may require that certain subsets of features from different feature families are not available with one another. A restriction rule may supersede any and all usage rules, as well as any package rules, so that a product definition may be constrained through the addition of such rules. For example, a restriction rule may be part of the product definition. The $h^{th}$ restriction rule in this product definition may be composed of feature families in the set in $\mathbb{G}_0^h$ with $\mathbb{G}_0^h \subseteq \mathbb{F}$, where, for some feature family in $\mathbb{G}_0^h$, a non-empty subset of features is chosen such that $\mathcal{G}_{0,k}^h \subset \mathcal{F}_k$. It is contemplated in one non-limiting example that in the case of restriction rules, $\mathbb{G}_0^h$, can be equal to the entire set of families, $\mathbb{F}$, whereas, for usage rules, $\mathbb{G}_j^h$ must be a proper subset of $\mathbb{F}$, not including feature family $F_j$. It is also contemplated that $\mathcal{G}_{0,k}^h$ may be a proper subset of $\mathcal{F}_k$, otherwise, if the features from $\mathcal{F}_k$ were included in the restriction rule, there may be an empty product definition. Given this set of feature families and the constituent subsets of features, a restriction rule may be given by the following equation:

$$\bigwedge_{(\mathcal{G}_{0,k}^h \in \mathbb{G}_0^h)} \left( \bigvee_{(g_{0,k,m}^h \in \mathcal{G}_{0,k}^h)} g_{0,k,m}^h \right) \leftrightarrow 0 \quad (2)$$

where '0' refers to the empty set.

Restriction rules may provide the application 12 with a compact way of representing those combinations of features which cannot co-occur, but at the cost of using negative logic, whereas usage rules may be constructed with positive logic.

In order to generate a compact, numerical representation of product definition, the application 12 may convert Boolean algebraic rules into positive logic (i.e., generalized availability rules). It is contemplated that usage rules may already be represented in the form of availability rules and the phrase availability rules may be implemented to describe conversion/interaction of other rule types into a common positive logic representation. For example, the positive logic generalized availability rules may be generated by taking the complement of Equation (2) and converting the negative logic rule to an equivalent positive logical form as shown below in Equation (3):

$$\neg \bigwedge_{(\mathcal{G}_{0,k}^h \in \mathbb{G}_0^h)} \left( \bigvee_{(g_{0,k,m}^h \in \mathcal{G}_{0,k}^h)} g_{0,k,m}^h \right) \leftrightarrow 1 \quad (3)$$

The present disclosure then contemplates that by applying De Morgan's law to Equation 3, the result in Equation (4) may be generated:

$$\bigwedge_{(\mathcal{G}_{0,k}^h \in \mathbb{G}_0^h)} \neg \left( \bigvee_{(g_{0,k,m}^h \in \mathcal{G}_{0,k}^h)} g_{0,k,m}^h \right) \leftrightarrow 1 \qquad (4)$$

where $\neg (\bigvee_{(g_{0,k,m}^h \in \mathcal{G}_{0,k}^h)} g_{0,k,m}{}^h)$ represents the complement of the set of features in $\mathcal{G}_{0,k}{}^h$.

As a result of the disjunction introduced by the application of De Morgan's law, Equation (4) may be expanded into a set of $l_{\mathbb{G}_0^h}$ overlapping generalized availability rules of the form $\neg (\bigvee_{(g_{0,k,m}^h \in \mathcal{G}_{0,k}^h)} g_{0,k,m}{}^h) \to 1$. In this case, a generalized availability rule is one in which the left-hand-side of the rule is represented by the logical-or (disjunction) of one or more features from a common feature family. While this set of generalized availability rules provides a valid representation of the restriction rule, there is overlap amongst these availability rules, which should be resolved before completion of the process of generation of a compact numerical representation of product definition.

A restriction rule may be converted to a set of non-overlapping generalized availability rules by first selecting a feature family from $\mathbb{G}_0{}^h$ with the restriction rule that may be considered to have the greatest number of dependencies. In other words, the non-overlapping availability rules may be that feature family which is the least likely to appear on the right-hand-side of any usage rule group, but is associated with a left-hand-side rule group that is connected, either directly or indirectly, to other feature families through the rule group's right-hand-side expressions. To determine which feature family in a restriction rule has the greatest number of dependencies the present disclosure contemplates constructing a directed-acyclical-graph (DAG) representation of feature family dependencies as implied by the Boolean algebraic usage rules. For example, if $\mathcal{G}_{0,1}{}^h$ is the most dependent feature family in $\mathbb{G}_0{}^h$, then, a restriction rule with features from $l_{\mathbb{G}_0^h}$ different feature families can be translated into a group of $l_{\mathbb{G}_0^h}$ non-overlapping generalized availability rules by the following mathematical steps disclosed below as Equations 5-8:

$$\neg \left( \bigvee_{(g_{0,1,m}^h \in \mathcal{G}_{0,1}^h)} g_{0,1,m}^h \right) \to 1 \qquad (5)$$

$$\left( \bigvee_{(g_{0,1,m}^h \in \mathcal{G}_{0,1}^h)} g_{0,1,m}^h \right) \to \neg \left( \bigvee_{(g_{0,2,m}^h \in \mathcal{G}_{0,2}^h)} g_{0,2,m}^h \right) \qquad (6)$$

$$\left( \bigvee_{(g_{0,1,m}^h \in \mathcal{G}_{0,1}^h)} g_{0,1,m}^h \right) \to \qquad (7)$$
$$\left( \bigvee_{(g_{0,2,m}^h \in \mathcal{G}_{0,2}^h)} g_{0,2,m}^h \right) \wedge \neg \left( \bigvee_{(g_{0,3,m}^h \in \mathcal{G}_{0,3}^h)} g_{0,3,m}^h \right)$$

$$\vdots$$

$$\left( \bigvee_{(g_{0,1,m}^h \in \mathcal{G}_{0,1}^h)} g_{0,1,m}^h \right) \to \bigwedge_{k=2}^{l_{\mathbb{G}_0^h}-1} \qquad (8)$$
$$\left( \bigvee_{(g_{0,k,m}^h \in \mathcal{G}_{0,k}^h)} g_{0,k,m}^h \right) \wedge \neg \left( \bigvee_{(g_{0,l_{\mathbb{G}_0^h},m}^h \in \mathcal{G}_{0,l_{\mathbb{G}_0^h}}^h)} g_{0,l_{\mathbb{G}_0^h},m}^h \right)$$

The results illustrated in Equations 5-8 are non-overlapping. However, it may be likely that there will be overlap between these generalized availability rules with any usage rules specified for feature family $\mathcal{G}_{0,1}{}^h$. Hence, rules may be grouped separately, and may resolve the overlap in a future step through rule group interaction. Further additional dependencies may be introduced for the most dependent family associated with the restriction rule, which augments the number of connections in the DAG representation of feature family dependencies.

FIG. 9 illustrates a translation (400) of the two restriction rules (410, 420) into two sets of generalized availability rules (430, 440). Restriction rules (410, 420) are the same restriction rules (380) discussed above with reference to FIG. 8 but are exemplified in FIG. 9 as generalized availability rules. The left-hand-sides of the generalized availability rules (430, 440) reflect the most dependent feature family in the original respective restriction rule (410, 420). For both restriction rules (410, 420), feature family B is the most dependent of all feature families appearing in the restrictions, and thus appears as the left-hand-side feature family in both cases. It is contemplated that this translation may permit processing the generalized availability rules in a self-consistent fashion with the original usage rules. However, it is further contemplated that this convention may turn out to be irrelevant for the super-configuration generation process, and different choices for the order in which feature families are considered within a restriction rule would all yield correct results.

The application 12 may also implement package rules that have a structure which appears to be similar to that of usage rules. A package rule may state that some feature from a given feature family is included (as opposed to available) with one or more subsets of features from one or more other feature families, including package families. Package rules may be organized into groups, where a group is characterized by a common left-hand-side feature family. The $h^{th}$ package rule associated with left-hand-side feature family $\mathcal{F}_j$ is illustrated below in Equation 9:

$$f_{j,i} \leftrightarrow \bigwedge_{(\mathcal{G}_{j,k}^h \in \mathbb{G}_j^h)} \left( \bigvee_{(g_{j,k,m}^h \in \mathcal{G}_{j,k}^h)} g_{j,k,m}^h \right) \qquad (9)$$

The present disclosure contemplates that the structure of a package rule may be nearly identical to that of the usage rule as given in Equation 1, with the exception of replacement of operator $\to$ with $\leftrightarrow$. However, interpretation of a package rule may be more complicated than that of a usage rule, as it may require a flattening process to convert it to a positive logic representation.

A package rule may supersede any and all usage rules with a common left-hand-side feature family. The flattening process for a package rule may be performed in two sequential steps. First, elimination of combinations of features as represented by the package rule's right-hand-side from the same feature family's usage rules, if that combination exists. Second, augmentation of the left-hand side's feature family rule group with the package rule converted to a usage rule.

The product definition application may begin the flattening process by converting the package rule's right-hand-side to a restriction rule and generating a set of generalized availability rules for this restriction, as described above. Then, the generalized availability rules may be interacted with the usage rule group for feature family $\mathcal{F}_j$, to create a new rule group. This is described below with respect to rule group interaction. This process may be repeated for all package rules with left-hand-side features from feature family $\mathcal{F}_j$. Next, each of these package rules with left-hand-side features from feature family $\mathcal{F}_j$ may be converted to a usage rule, and the new usage rules may be added to the transformed group of usage rules for family $\mathcal{F}_j$.

Given a package rule for $f_{j,i}$, the right-hand-side may be treated as a restriction rule as shown below in Equation 10:

$$\bigwedge_{(\mathcal{G}_{j,k}^h \in \mathbb{G}_j^h)} \left( \bigvee_{(g_{j,k,m}^h \in \mathcal{G}_{j,k}^h)} g_{j,k,m}^h \right) \quad (10)$$

This restriction rule may then be converted to a block of generalized availability rules, and may subsequently interact with the current block of usage rules for feature family $\mathcal{F}_j$. Application of this restriction rule to the existing usage rule may eliminate any rules containing the combination of features in the restriction, irrespective of the left-hand-side feature from $\mathcal{F}_j$. When there are multiple package rules with different left-hand-side features from feature family $\mathcal{F}_j$, the product definition application may process the rules as restriction rules, before proceeding to the next step. Upon completion of this stage of processing restrictions, each of the processed package rules for feature family $\mathcal{F}_j$ may be treated as usage rules. These usage rules may then be appended to the transformed block of usage rules for feature family $\mathcal{F}_j$ as shown below in Equation 11:

$$f_{j,i} \rightarrow \left( \bigwedge_{(\mathcal{G}_{j,k}^h \in \mathbb{G}_j^h)} \left( \bigvee_{(g_{j,k,m}^h \in \mathcal{G}_{j,k}^h)} g_{j,k,m}^h \right) \right) \quad (11)$$

This entire process may ensure that feature combinations represented by the package rule are unambiguously associated with the left-hand-side feature, and that there is no overlap in the resulting rules. The present disclosure further contemplates that package rules may have precedence over usage rules, and restriction rules may supersede both usage and package rules.

The application 12 may also convert usage and restriction rules to binary vector representations, or local super configurations. These local super configurations may be used by the application 12 to form the basis of generating a global or final super-configuration representation of a product definition. The package rules can be interpreted as a combination of processing of both restriction rules and usage rules. It is also contemplated that the translation process may be disregarded in this non-limiting example.

As discussed above, a usage rule or a generalized availability rule may consist of one or more features from a common feature family on the rule's left-hand-side, with an operator of "is available with," followed by a series of features, frequently from multiple families, on the rule's right-hand-side. Each availability rule may have a unique and equivalent binary vector, local super-configuration representation. Considering only the families that are contained in a rule itself, a binary vector may be constructed for all features of these families, where each feature that is in the rule would have an associated value of one, and where all other features from these families would be assigned values of zero. The present disclosure contemplates constructing binary vector representations of product definition rules which consider all feature families, not just those that appear in each rule. If a feature family does not appear in a rule, then values are assigned unity to every feature within that feature family, as this local rule is indifferent to those features.

For example, consider the interpretation of a typical availability rule, where the left-hand-side feature is considered to be available with one or more features from one or more feature families which are specified on the rule's right-hand-side. A configuration can itself be interpreted as an extreme case of how one feature from a given feature family can be considered to be available with unique combinations of features from all other feature families. In this example, any feature family may be arbitrarily chosen as the dependent left-hand-side feature family. Hence, an equivalent representation of a availability rule is given by the Boolean expression shown in Equation 12 below:

$$f_{j,i} \wedge \left( \bigwedge_{(\mathcal{G}_{j,k}^h \in \mathbb{G}_j^h)} \left( \bigvee_{(g_{j,k,m}^h \in \mathcal{G}_{j,k}^h)} g_{j,k,m}^h \right) \right) \quad (12)$$

Equation 12 illustrates replacing the "is available with" operator $\rightarrow$ with the conjunction operator $\wedge$. With this representation, any hierarchical ordering may be lost that had been previously introduced in the product definition authoring process, but, this ordering may be irrelevant when generating a configuration representation.

With reference to data structures and rules-processing, the availability rules may be arranged into groups of rules, where a unique group is characterized by those rules whose left-hand-sides are from a common feature family. The notation $p_j^h$ may be used to refer to that local super-configuration associated with the $h^{th}$ availability rule for left-hand-side feature family j.

FIG. 10 illustrates pseudo code (450) that may be implemented by the application 12 to construct a local super-configuration. The pseudo code (450) illustrates that for such availability rule as illustrated for this feature family, with left-hand-side feature given by $f_{j,i}$, construction of the corresponding local super-configuration may be codified.

The present disclosure contemplates that there are many possible variations on pseudo code (450). For example, FIG. 11 illustrates an alternate pseudo code (460) that may be implemented by the application 12 for the construction of the local super-configuration for availability rule h.

As disclosed generally above, in order to translate availability rules to local super-configurations, the application 12 may implement positive logic manipulations by specifying which features may be grouped together. However, restriction rules may be implemented by application 12 utilizing negative logic, where features that cannot co-occur are specified. The application 12 may construct a positive logic representation of a restriction rule as a sequence of generalized availability rules (e.g., Equations 5) where representations are structured such that all left-hand-side features are associated with the most-dependent feature family in the restriction rule.

For purposes of translating a restriction rule to a sequence of local super-configurations, the application 12 may be ignore distinctions between left- and right-hand-side elements of generalized availability rules, following the logic highlighted above for interpretation of availability rules. The translation process implemented by the application 12 for a restriction rule results in a set of local super-configurations that may require the number of restriction rules to be equal to the number of feature families in the restriction rule. The generation of this set of local super-configurations by the application 12 may be dependent on the order in which feature families are processed.

For example, FIG. 12 is an exemplary pseudo code (470) that may be implemented by the application 12 for the construction of a local super configuration from a restriction rule. It is contemplated that the notation $q_h^k$ may be used to refer to the local super-configuration for the $h^{th}$ restriction rule after processing feature family k. It is also contemplated that the notation for the vectors $p_j^h$ and $q_h^k$ may be different from one another. In the example of availability rules, multiple rules (h) may be associated with the same left-hand-side feature family (j). Whereas in the example of restriction rules, multiple restricted feature families (k) may be associated with the same restriction rule (h). It is further contemplated that for some arbitrary restriction rule indexed by h, the algorithm 470 may be one non-limiting example for generating a sequence of associated local super-configurations.

The application 12 may generate a set of local super configurations using the converted results of Boolean algebraic usage and restriction rules. These local super configurations may be grouped by rule type (e.g. usage or restriction). These local super-configurations are then arranged into two separate matrices. As shown below in Equation 13, the matrix P, representing usage rules, may be composed of a series of sub-matrices of local super-configurations, where each sub-matrix is associated with a feature family whose members formed the left-hand-sides of the individual Boolean algebraic usage rules:

$$P = \begin{bmatrix} P_1 \\ P_2 \\ \vdots \\ P_{N_f} \end{bmatrix} \quad (13)$$

In the representation shown in Equation 13, a sub-matrix $P_j$ may be empty if there are no rules with features from family $\mathcal{F}_j$ on the left-hand-side. The families may also be ordered by sorted DAG order, as an effective heuristic order for subsequent processing. Similarly, if there are $n_r$ restriction rules in the product definition, a matrix Q, representing the restriction rules, may be composed of $n_r$ sub-matrices, where each sub-matrix corresponds to a single restriction rule which has been translated to a set of generalized availability rules as shown below in Equation 14:

$$Q = \begin{bmatrix} Q_1 \\ Q_2 \\ \vdots \\ Q_{n_r} \end{bmatrix} \quad (14)$$

The application 12 may determine that a critical characteristic of the P and Q matrices exists. The application 12 may make such a determination by first determining if a given a set of availability rules are said to be non-overlapping, then any two local super-configurations from the same block $P_j$ may be considered to be non-overlapping. A pair of local super-configurations may be non-overlapping if their logical-and results in an invalid super-configuration (i.e., that there is at least one feature family in this result that does not have any features active). If interactions are found between two local super-configurations from the same block, then the local super-configurations, and their corresponding Boolean algebraic representations, can be corrected to eliminate the interaction by the application 12 according to the process described below.

Similarly, for any block of local super-configurations representing a restriction rule, $Q_h$, taking the logical-and of any two of the local super-configurations may result in an invalid local super-configuration. This may result directly from the construction of successive local super-configurations for a restriction rule, which involves the complement operation on a previous result for a feature family. The logical-and of a feature family's sub-vector and its complement may yield a null vector. In this example, the local super-configurations corresponding to the same restriction rule block do not interact.

In the limit of a complete set of unique configurations, the logical-and of any two configurations may yield an invalid configuration (i.e., at least one feature family will be empty). Similarly, for a non-overlapping set of global super-configurations, the logical-and of any two super-configurations may result in an invalid super-configuration.

The application 12 may also express a product definition as one or more super-configurations along a continuum. At one end of the spectrum, a single, universal super-configuration may exist which corresponds to a local rule stating that features can be put into any number of combinations. Then, a local super-configuration representation of product definition rules may exist which begin to describe how features interact. Intermediate stages of processing may also exist where rule interactions begin to be considered. After all rules have been processed, a set of non-overlapping super-configurations may be determined. On the opposite end of the spectrum, the global super-configurations can be expanded into an enumeration of configurations.

FIG. 8 illustrated one non-limiting example that may be implemented by the application 12 of GDP-product definition rules that included five feature families. In order to construct a local super-configuration representation of the rules illustrated in FIG. 8, it is contemplated that usage of "Family" rules may denote which features are available.

In the case of the usage rules, unique groups may have rules for each of the five families. FIG. 13 illustrates a local super-configuration representation (480) for the set of logical-style product definition rules (490) involving five feature families (500, 510, 520, 530, 540, 550). However, only the usage rules involving feature families A and B (500, 510) may be non-trivial (the rules for any of the families C, D and E (520, 530, 540) can be compressed to universal super-configurations). Hence, the matrix P may consist of two sub-matrices, corresponding to feature families A and B (500, 510). Two usage rules (550) for feature family A have a set of two corresponding local super-configurations, while five usage rules (560) for feature family B have a set of five corresponding local super-configurations. Further, since feature family A may be dependent on feature family B, the order of sub-matrices in P (570) will have feature family B followed by feature family A. It is also contemplated that there may be two blocks of rules, one corresponding to the second-most dependent feature family B, and a second corresponding to the most dependent feature family A.

Similarly, two of the restriction rules (560), $B_2 \wedge E_2 \leftrightarrow 0$ and $B_3 \wedge C_3 \wedge D_2 \wedge E_2 \leftrightarrow 0$, may be converted to two distinct groups of availability rules, through application of De Morgan's law as disclosed above. The resulting local super-configuration (600) representation of these two restriction rules may be represented as shown in FIG. 14. FIG. 14 further illustrates that a total of six local super-configurations (660) are generated from the two translated restriction rules. A first block ($q_1^B$ and $q^E$) of local super-configurations (660) correspond to one of the translated restriction rules and a second block ($q_2^B$, $q_2^C$, $q_2^D$ and $q_2^E$) for the other translated restriction rule. The present disclosure contemplates that the translation process may not be unique. In other words, there may be multiple local super-configuration representations of a restriction rule.

The application 12 may employ an efficient methodology for converting Boolean algebraic rules to super-configurations by implementing a super-configuration compression algorithm, which takes as input a set of super-configurations (or configurations) and replaces it with a more compact (i.e., fewer in number) set of super-configurations. However, if compression is not possible, then the input set may be retained. Compression may also be implemented as a feature family-specific operation. Assuming a feature family $\mathcal{F}_j$, and letting the vector $x_j$ be a mask of all one's, with the exception of zero's for all members of the feature family $\mathcal{F}_j$ (i.e., $x_j=1$, followed by $x_{j,j}=0$), $\mathbf{s}_k^{\neg j}=s_k \wedge x_j$ may then be defined as the $\mathcal{F}_j$-family-masked super-configuration k, where $\wedge$ is the bit-wise logical-and operator. Two super-configurations k and h can be compressed for feature family $\mathcal{F}_j$ into a single super-configuration if and only if the masked super-configurations are equal, $\mathbf{s}_h^{\neg j}=\mathbf{s}_k^{\neg j}$. In this example, the application 12 may define a new, replacement super-configuration that is indexed by g, using the following process. First, by setting $s_g=\mathbf{s}_k^{\neg j}$, g may index an invalid super-configuration, since all components of feature family $\mathcal{F}_j$ are zero. Then, the sub-vector $s_{g,j}$ may be corrected by setting $s_{g,j}=s_{k,j} \vee s_{h,j}$, where $\vee$ is the bit-wise logical-or operator, thereby creating a valid super-configuration g, which replaces the original super-configurations, k and h.

FIG. 15 illustrates pseudo code (700) which may be implemented by the application 12 for compression of a matrix of super-configurations in the dimension of feature family $\mathcal{F}_j$ which may be incorporated in the product definition application. The pseudo code (700) codifies that for each super-configuration k, a binary vector $\mathbf{s}_k^{\neg j}$ may be constructed. The pseudo code (700) further illustrates that $\mathbf{s}_k^{\neg j}$ may be verified to see if it is an existing key for a hash map $H_j$. If $H_j\{\mathbf{s}_k^{\neg j}\}$ does not exist, then assign $H_j\{\mathbf{s}_k^{\neg j}\}=s_{k,j}$. Otherwise, if $H_j\{\mathbf{s}_k^{\neg j}\}$ does exist, then its value may be modified by $H_j\{\mathbf{s}_k^{\neg j}\}=H_j\{\mathbf{s}_k^{\neg j}\} \vee s_{k,j}$ (i.e., replace the existing value of the hash with the logical-or of the hash value and the sub-vector $s_{k,j}$). A hash map may then be created where the keys are all unique super-configurations with $\mathcal{F}_j$-family values set to all zero, and the corresponding hash map values are the $\mathcal{F}_j$-family compressed sub-vectors. When executed, the pseudo code (700) then processes all the existing super-configurations into a new, compressed set of super-configurations. The new compressed super-configurations are generated by setting $s_g=\mathbf{s}_k^{\neg j}$, for each unique value $\mathbf{s}_k^{\neg j}$. Then $s_{g,j}$ may be replaced with the sub-vector $H_j\{\mathbf{s}_k^{\neg j}\}$. Thus, for all keys in the hash map the pseudo code (700) creates a super-configuration by inserting the key's corresponding sub-vector value back into the key, where the value provides the $\mathcal{F}_j$-family sub-vector and the key provides the vector for all other families.

The present disclosure contemplates that one aspect related to compression is how to select the order of processing of feature families. One heuristic that the application 12 may implement is to compress families in reverse order of the topologically sorted DAG. In this case, sequential compression may occur on those feature families which have the greatest dependencies, as defined by the rules themselves. Alternatively, the application 12 may implement an algorithmic approach, where at each step, compression occurs in the dimension of that feature family which may yield the highest level of compression. Stated differently, for each family j, the number of unique instances of the masked super-configurations $\mathbf{s}_k^{\neg j}$ is counted. Next, compression along the dimension of that feature family which has the smallest number of unique masked super-configurations may occur. The application 12 may then repeat the process of (1) finding the family that yields the highest compressibility, given the current set of super-configurations, and (2) compressing all existing super-configurations into a new set of super-configurations using the found family as the dimension of compression, until compression is no longer possible (i.e., when the count of unique masked super-configurations $\mathbf{s}_k^{\neg j}$ is equal to the total number of super-configurations for all feature families).

The application 12 may also implement compression in alternative non-limiting methods. First, compression can be applied to individual configurations to generate global super-configurations. Second, compression can be applied on-the-fly to partially local super-configurations (i.e., to valid super-configurations as they are being generated). Finally, compression can be applied to local super-configuration representations of product definition rules. In this case, careful selection of those blocks of local super-configurations occurs so that certain properties may be maintained.

The application 12 may also implement compression to configurations, super-configurations, as well as to local super-configuration representations of the product definition rules. The method and system disclosed above with respect to translating restriction rules to local super configurations may produce a compressed representation. Based on this understanding, the next aspect that may require processing entails compressing usage rules. Such a compression process may be applied to each of the sub-matrices $P_B$ and $P_A$ (where the sub-matrices of Q are by construction incompressible). First, sub-matrices $p_B^1$ and $p_B^2$ cannot be compressed with any other row of $P_B$. Hence, the local super-configurations of sub-matrices $p_B^1$ and $p_B^2$ may be maintained in their present state. Then, the sub-matrix $p_B^3$ can be compressed with $p_B^4$ in the dimension of feature family C. This compression is illustrated by the shaded sub-matrix $p_B^3$ illustrated in FIG. 16. The sub-matrix $p_B^3$ can then be replaced with the $p_B^3 \vee p_B^4$. The result of compressing sub-matrix $p_B^3$ with sub-matrix $p_B^4$ may not be compressible with sub-matrix $p_B^5$. In that case, sub-matrix $p_B^4$ equals sub-matrix $p_B^5$, and the local super-configuration $p_B^5$ is essentially removed from the matrix $P_B$. Applying the compression process to the sub-matrix $P_A$ (500) may not result in any changes.

FIG. 16 illustrates an exemplary compressed super-configuration (710) for each of the five feature families (500, 510, 520, 530, 540) as compressed feature families (730, 740, 750, 760, 770) with the corresponding availability rules (780). This example of the five feature families (720-770) are illustrated after compression to the availability rules in the dimension of feature family C. This example further highlights in grey the result of the non-limiting exemplary compression process.

The application 12 may therefore be designed to (1) generate a local super-configuration representation of Boolean algebraic rules of product definition, and (2) compress configurations or super-configurations (both local and global). The present disclosure also contemplates that the resulting local super-configuration representation of product rules can be arranged into blocks of non-overlapping super-configurations and that an efficient algorithm for generating a global super-configuration representation of product definition should take advantage of this non-overlap property.

The generation of a set of global super-configurations may require determining how all of the local product definition rules can interact with one another. This may require consideration on order of $2^m$ possible interactions, where m is the total number of flattened usage rules. This space can be pruned dramatically by taking advantage of the non-overlap property. Knowing that local super-configurations within a rule group (either usage or restriction) are by construction non-overlapping, there is no need to explicitly check for overlap for these types of rule groups. Furthermore, these local super-configurations within a rule group can themselves be compressed, especially, but not exclusively, when common right-hand-side expressions across multiple rules are associated with different left-hand-side features.

For example, if two arbitrary groups of usage rules are considered that correspond to two separate compressed sets of non-overlapping local super-configurations, with $n_u^i$ and $n_u^j$ members, respectively, then, for any pair of rules, one from each group, the rule interaction may defined as the logical-and of the two rules. If the result is one in which all feature families are active with at least one feature, then a valid local super-configuration may exist. Otherwise, the result may be discarded. This exemplary process of interacting all rules from one group with all rules from a second group forms the cartesian product of the two rule groups. As such, there may exist $n_u^i n_u^j$ interacted local super-configurations in the cartesian product. However, the present disclosure contemplates that (1) many of the results of this operation yield invalid super-configurations, which are not stored, and (2) the resulting valid super-configurations can themselves be compressed into a more compact form after forming the cartesian product. Also, the present disclosure contemplates that the cartesian product itself may be a group of non-overlapping super-configurations.

The application 12 may further determine that the set of super-configurations generated by taking the cartesian product of two sets of super-configurations, each of which is non-overlapping, results in a new set of super-configurations which themselves are non-overlapping. For example, given two rule groups, $P_i$ and $P_j$, encoded as blocks of local super-configurations, there may be no within group overlap between individual rules in $P_i$ and $P_j$: $p_{i,h} \wedge p_{i,k}$ may be an invalid super-configuration for any combination of h,k, (h≠k). Similarly, $p_{j,m} \wedge p_{j,n}$ may also be an invalid super-configuration for any combination m,n(m≠n). If it is assumed that $p_{i,h} \wedge p_{j,m} = r_{h,m}$ and $p_{i,h} \wedge p_{j,n} = r_{h,n}$ are both valid super-configurations, and that $r_{h,m} \wedge r_{h,n} = p_{i,h} \wedge p_{j,m} \wedge p_{j,n}$ may not be a valid super-configuration because the logical-and of an invalid super-configuration with a valid super-configuration may itself be an invalid super-configuration, it may not be possible to correct an invalid super-configuration with a logical-and operation. Such a correction may not be possible because this type of operation can only restrict features.

A similar construction may illustrate that the logical-and of any pair of valid super-configurations which are generated as part of forming the cartesian product between two sets of non-overlapping super-configurations may also be an invalid super-configuration. Hence, after formation of each cartesian product, a set of non-overlapping super-configurations remain, which may be processed with the next set of non-overlapping super-configurations from a rule group in the subsequent step. The product definition application continues this sequence until all rule groups have been processed, yielding at the end a set of non-overlapping, global super-configurations.

The application 12 may also determine that a product definition may consist of feature families that can be completely and deterministically defined as a function of one or more other feature families. For example, super-families may be evaluated as being the collection of two or more feature families and the ways in which they can be combined. One non-limiting example of a super-family in an automotive vehicle may include an entity for full-sized pickups that consists of body style, series, engine, transmission, drive and wheelbase, where every allowed combination of these base features is mapped to a unique entity. However, the present disclosure contemplates that deterministic feature families may appear in many other contexts and the present example may not be meant to be limiting. While deterministic families are frequently useful for helping to manage (define, create, update, etc.) a product definition, the co-existence of deterministic feature families with their determinants (i.e., those feature families which unambiguously define the deterministic feature family) in a super-configuration representation may have a detrimental impact on construction of compressed super-configuration representations.

For example, a binary feature family $\mathcal{F}_k$ may include two possible features, $f_{k,1}$ and $f_{k,2}$. In this example, a second binary feature family $\mathcal{F}_j$ may also be completely determined by $\mathcal{F}_k$, where $f_{j,1}=1$ if-and-only-if $f_{k,1}=1$, and $f_{j,2}=1$ if-and-only-if $f_{k,2}=1$. In examining both feature families $\mathcal{F}_j$ and $\mathcal{F}_k$ to determine if they are included in a super-configuration representation, it may be impossible to compress along the dimension of either of these feature families. Such difficulty may exist as there is a one-to-one mapping of the existence of one feature from $\mathcal{F}_k$ to a single feature in $\mathcal{F}_j$. In other words, a super-configuration may never exist with both features active in either $\mathcal{F}_k$ or $\mathcal{F}_j$ under these conditions, if both $\mathcal{F}_k$ and $\mathcal{F}_j$ are included in the super-configuration matrix. On the other hand, isolating one of these feature families (e.g., $\mathcal{F}_k$), and maintaining a separate functional relationship between $\mathcal{F}_k$ and $\mathcal{F}_j$, may allow introduction for a potential greater compression of the final super-configuration matrix.

If such deterministic relationships can be identified, then the product definition application may eliminate one or more of the feature families from consideration. Furthermore, the numerical super-configuration representation may be augmented with the relationships between the deterministic family and its determinants. The product definition application may also detect multi-way deterministic relationships where one feature family may be completely defined by the combinations of features from multiple families.

For example, given a set of $N_c$ configurations which completely represent a product definition, a feature family $\mathcal{F}_j$ may be checked to verify whether it is deterministic (i.e., that it may completely be specified by the combination of one or more other feature families). All features associated with feature family $\mathcal{F}_j$ may be removed from the configuration data, and then verification may occur to determine whether or not the resulting set of restricted configurations is still unique. Feature family $\mathcal{F}_j$ may be considered to be deterministic if there are still $N_c$ unique $\mathcal{F}_j$-excluded configurations remaining after feature family $\mathcal{F}_j$ has been removed. In other words, for $\mathcal{F}_j$ to be deterministic, all $\mathcal{F}_j$-excluded configurations should be unique. The combination of remaining features (or a subset of them) should also uniquely determine the identity of the feature from feature family $\mathcal{F}_j$. Equivalently, $\mathcal{F}_j$ may be deterministic if there is no overlap amongst the $\mathcal{F}_j$-excluded configurations.

In another example of a feature family which may not be deterministic, it may be assumed that $\mathcal{F}_j$ corresponds to a binary feature family which is optional everywhere. There may also exist $N_c/2$ unique $\mathcal{F}_j$-excluded configurations remaining after removing feature family $\mathcal{F}_j$. Since there may be fewer $\mathcal{F}_j$-excluded configurations remaining than the number of configurations which were present at the start, it may be assumed that feature family $\mathcal{F}_j$ is not deterministic.

The present disclosure contemplates a case in which the same product definition may be represented by $N_s$ super-configurations. Starting with a completely compressed block of non-overlapping super-configurations, the present feature family $\mathcal{F}_j$ may be deterministic. For feature family $\mathcal{F}_j$ to be deterministic it may be required that it have only one active feature for every super-configuration; (e.g. $\mathcal{F}_j$ is sparse). If a feature family is not sparse, then it most likely cannot be deterministic. For example, if there are two features active for family $\mathcal{F}_j$ in some super-configuration, then the mapping of any combination of features from other feature families to family $\mathcal{F}_j$ is not unique. This may imply that a deterministic relationship between $\mathcal{F}_j$ and the other feature families cannot be inferred. In such an example, $\mathcal{F}_j$ may be potentially deterministic if-and-only-if $\Sigma_{i=1}^{t_j} s_{k,j,i} = 1$ for all super-configurations $s_k$.

If $\mathcal{F}_j$ is found to be sparse, then all features associated with feature family $\mathcal{F}_j$ may be removed from the super-configuration matrix and it may be determined whether there is no overlap amongst the $\mathcal{F}_j$-excluded super-configurations. Furthermore, such a result may determine that $\mathcal{F}_j$ is deterministic. The non-overlap condition can be checked by interacting (i.e., taking the logical-and) of every pair of $\mathcal{F}_j$-excluded super-configurations and checking to see that the result is an invalid super-configuration (i.e., that there are zero configurations represented by the result if one or more feature families are empty or inactive).

Furthermore, if the feature family is not sparse, then it may not be deterministic. For example, if there are two features active for family $\mathcal{F}_j$ in some super-configuration, then the mapping of any combination of features from other feature families to family $\mathcal{F}_j$ may not be unique. This may then imply that a deterministic relationship between $\mathcal{F}_j$ and other feature families may not be capable of being inferred.

FIG. 18 illustrates a non-limiting pseudo-code (780) which may be implemented by the application 12 for identifying deterministic feature families for a group of non-overlapping super-configurations. The illustrated pseudo-code (780) illustrates an exemplary procedure used by the application 12 for providing results which are subsequently used for identifying determinant feature families.

Once a feature family has been determined to be deterministic, the application 12 identifies those feature families on which the deterministic feature family is dependent. The application 12 may identify the existence of one or more deterministic feature families by identifying those feature families which may be active and inactive for every interacted pair of super-configurations. It may be necessary that every interacted pair of super-configurations contain at least one inactive feature family, other than the deterministic feature family itself, for a deterministic relationship to exist (this signifies that there is no overlap between the two super-configurations after eliminating the deterministic feature family). The identification of inactive feature families in the matrix of interacted super-configurations forms the basis for identifying the minimal set of determinant feature families and the deterministic relationship.

If it is assumed that once the application 12 determines some feature family $\mathcal{F}_j$ is deterministic, then verification may occur to determine whether $\mathcal{F}_j$ is sparse and that there is no overlap in the $\mathcal{F}_j$-excluded super-configurations. The present disclosure contemplates two possible instances for the overlap detection process. One non-limiting instance may occur when there is an overlap in an interaction for family $\mathcal{F}_j$. A second non-limiting instance may occur when overlap in the family $\mathcal{F}_j$ is absent.

For example, FIG. 17 illustrates a group of non-overlapping super-configurations (720) with feature families A, B, C (730, 740, 750). For this non-limiting example, it was previously determined that feature family A was found to be deterministic, and identification needs to occur to find if feature families B and C are determinants. Three of the feature families, A, B and C (730, 740, 750), are local super-configurations, where feature family A (730) has already been identified as being deterministic. Since it has already been pre-determined that feature family A (730) is deterministic, it would be advantageous to determine the possible ways in which features in A (730) can be determined by the remaining features. Stated differently, the present disclosure contemplates determining if feature family B (740) or C (750) are deterministic. First, the interaction of sub-matrices (760) $r_1$ and $r_2$ may be considered. In this case, there may be an overlap in deterministic feature family A (730) as well as in the potential determinant feature family C (750), with no overlap in feature family B (740). In this non-limiting example, an incorrect conclusion may be that $A_1$ is determined by $C_1$.

On the other hand, it may be correct to conclude that feature $A_1$ of feature family A (730) may be determined by the presence of either feature $B_1$ or $B_3$ of feature family B (740), but an overlap may not exist in feature family B (740) for this interaction. The present disclosure therefore contemplates that when there is overlap in the interaction pattern for a deterministic feature family (i.e., that the same deterministic feature is present in the interacted super-configurations), it may not be possible to determine if the other feature families can explain the overlap, regardless of whether or not the potential determinant families have overlap in the interaction. In other words, when there exists a pattern of interaction in which there may be overlap in the deterministic feature family, it may not be possible to derive any useful information about which other feature families can be used to identify the deterministic feature.

With reference back to FIG. 17, the present disclosure contemplates the interaction of sub-matrices (760) $r_1$ and $r_3$ where there is no overlap in the deterministic feature family A (730), nor in the potential determinant feature family B (740), but there is overlap in feature family C (750). Because of the overlap in family C (750), it can be concluded for this specific case that family C (750) cannot determine family A (730) (i.e., feature $C_1$ of family C (750) cannot determine both features $A_1$ and $A_2$ of family A (730)). Furthermore, since there is no overlap in family B (740), it can be concluded that family B (740) determines family A (730) in this case. Again considering the interaction of sub-matrices (760) $r_2$ with $r_3$, there is no overlap in deterministic family A (730) nor in family B (740), but there is overlap in family C (750). By the same arguments, family C (750) may not be a determinant of family A (730) for this interaction, leaving family B (740) as the sole determinant. FIG. 17 therefore demonstrates an exemplary basis for identifying a minimal, although not necessarily unique, set of determinant feature families for a previously identified deterministic feature family based on analysis of patterns of interaction from a block of non-overlapping super-configurations.

It is therefore contemplated that any interaction for which there is overlap in the deterministic feature family may be disregarded by the application 12, as this interaction potentially provides no useful information about which other feature families can be used to uniquely map to two different values in the deterministic feature family. Only then is consideration given to those interaction patterns where the deterministic feature family is inactive. For each interaction, it may be sufficient to identify only one other inactive feature family that can be used to identify the deterministic feature family. If there is only one such family in an interaction, then that feature family may be a determinant. However, it may be determined that there is more than one feature family, beyond the deterministic feature family, that can be chosen to describe a deterministic relationship from an interaction pattern. It may therefore be desirable to choose that family which has already been found to be a determinant by previously analyzing other patterns of interaction. If such a situation is found, the current pattern may provide no new information. Similarly, if a pattern of interaction with two or more potential determinant feature families is determined, where none of those families have been previously identified as determinants, then arbitrary selection may occur to choose one of the families or use other criteria (e.g., choose determinant families preferentially by whether or not they are orderable).

The process implemented by the application 12 for identifying determinants of a previously identified deterministic feature family $\mathcal{F}_j$ can include the following non-limiting sequence. First, for $N_8$ super-configurations, $$\frac{1}{2} N_8 (N_8 - 1)$$

interactions could be performed for every pair of super-configurations. For each of these interactions, it may be sufficient to merely store a binary signal for each feature family indicating whether or not the interaction resulted in an active (1) or inactive (0) feature family, and to only keep a record of unique patterns. Discarding those patterns of interactions for which family $\mathcal{F}_j$ was found to be active may occur, as these patterns may not provide any insight for identifying determinants. Then, for each remaining unique pattern, the number of inactive feature families is determined. The count may be bounded from below by two, as only those patterns for which both the deterministic feature family $\mathcal{F}_j$ and at least one other feature family are found to be inactive are considered. It is further contemplated that a second feature family may be required to be inactive as a condition of no overlap in the $\mathcal{F}_j$-excluded super-configurations. These patterns and their associated counts may also be stored in a hash map, which associates the count of inactive feature families with each unique pattern of interacted feature families. Given this hash map, the ascending count of inactive feature families may be sorted. The minimal set of determinants can then be found by sequentially evaluating the sorted patterns.

For example, starting with an empty list of determinants $\mathbb{X}_j$, a first sorted pattern may be considered, and a search for a feature family, other than $\mathcal{F}_j$, which may be set as inactive. Once the inactive family is found, it is added to the list of determinants. However, if there is more than one such feature family, one family is selected arbitrarily or some other criteria for family selection may be employed. Proceeding to the next pattern, if $\mathbb{X}_j$ already contains a feature family that is inactive in the pattern, the pattern may be skipped. However, if $\mathbb{X}_j$ does not contain a feature family that is inactive in the family, one of the inactive feature families may be added, other than $\mathcal{F}_j$, to the list of determinants. This procedure may then be repeated for each of the unique interaction patterns. The procedure may complete when a minimal set $\mathbb{X}_j$, of determinant families is established for deterministic feature family $\mathcal{F}_j$. Identifying the deterministic relationship can then occur by trivializing all other feature families other than $\mathcal{F}_j$ and those in $\mathbb{X}_j$, in the original super-configuration matrix, followed by compressing that matrix in the dimensions of the determinant feature families. The process of trivializing a feature family merely sets all features in this family for every super-configuration to a value of unity.

The application 12 may identify determinant feature families for a group of non-overlapping super-configurations in the algorithm 855 illustrated in FIG. 20 for which the deterministic feature families have already been identified. The application 12 may implement the processes described in algorithm 780 of FIG. 18 and algorithm 855 of FIG. 20. These processes may apply to identification of deterministic and determinant feature families for non-overlapping blocks of either local or global super configurations. Hence, relationships may be identified at many different levels. For example, relationships may be identified in original blocks of local Boolean algebraic availability rules, in intermediate results of processing these blocks of rules, or even in the final global super configuration matrix. Furthermore, multiple deterministic relationships may be simultaneously identified by these processes. It is contemplated that it may be beneficial to identify such relationships as early as possible in the process of converting local Boolean algebraic rules to global super-configurations as that provides an advantageous potential for avoiding unnecessary computations. However, such relationships may only become apparent after some rule groups have been interacted, so it is worthwhile to consider super-configuration generation strategies that incorporate these methods throughout the process.

One non-limiting example that may be implemented by application 12 includes identifying determinants of a previously identified deterministic family. For example, FIG. 19 illustrates a group of non-overlapping super configurations 850 (e.g., $r_1$, $r_2$, $r_3$, $r_4$, and $r_5$) with a non-trivial deterministic relationship.

The example illustrated in FIG. 19 extends upon the example illustrated in FIG. 17 and illustrates a single block of five non-overlapping super-configurations (850) labeled $r_1$-$r_5$ with feature families A (810), B (820), C (830) and D (840). In the first step, identification occurs for feature families A (810) and B (820) as being potentially deterministic, as they are both sparse. Interaction then occurs between each pair of super-configurations (850) to detect which of the sparse feature families (e.g., A (810), B (820), C (830) and D (840)) have no overlap as well as to create a matrix of unique family-based patterns of activity in these interactions.

FIG. 21 illustrates the resultant interaction (860) implemented by the application 12 of interacting each possible pair of super-configurations (850) provided in FIG. 19. As illustrated, the last five rows of FIG. 21 are shaded gray. This shading is to exemplify that these results may be determined as not being required in subsequent processing steps because the family based patterns (930-960) are repeated from the patterns in the first five rows.

FIG. 21 illustrates an interaction (870) by the application 12 of super-configuration (850) illustrated in FIG. 19. For example, interaction (870) $i_{1,2}$ illustrates the interaction of super-configurations (850) $r_1$ and $r_2$. FIG. 21 also illustrates each inactive family A (930), B (940), C (950) and D (960). Lastly, FIG. 21 illustrates the total number of inactive families (970). The shaded bottom five rows (i.e., interactions (870) $i_{2,4}$, $i_{2,5}$, $i_{3,4}$, $i_{3,5}$ and $i_{4,5}$) indicate that these interactions may be ignored during future evaluation as the family patterns A (880), B (890), C (900) and D (910) are repeated from the patterns in the first five rows (i.e., unshaded). Such a determination may be made based on the inactive family results (i.e., A (930), B (940), C (950) and D (960)).

As illustrated, once the application 12 interacts the super-configurations (850) (e.g., $i_{1,2}=r_1 \wedge r_2$) and unique family-based patterns of activity are found, the application 12 performs checks to see if there is any overlap when potential deterministic feature families are excluded. If feature family A (880) is excluded, one additional inactive family maybe found remaining amongst B (890), C (900) and D (910) for all five unique family-based patterns. Hence, family A (880) may be determined to be deterministic. On the other hand, by excluding family B (890), the fourth family-based interaction (870) of activity, $i_{1,5}$, may be found to have all other families active. Hence, family B cannot be deterministic. Families C (900) and D (910) were previously excluded from consideration as deterministic feature families, since they are not sparse in the super-configuration block (850).

Given family A (880) as the only deterministic feature family, the application 12 can find determinant feature families by first keeping only those patterns in which family A (880) is inactive (this eliminates pattern $i_{1,5}$), and then sorting these patterns in ascending order by the number of inactive families.

FIG. 22 illustrates the resulting list (1000) that may be generated by the application 12 for inactive patterns of feature family A (1010) by increasing count of total number of inactive patterns (1060). Interaction (1050) $i_{1,2}$ illustrates that, besides feature family A (1010), the only other inactive family is C (1030); hence, family C (1030) must be a determinant of feature family A (1010). Interaction (1050) $i_{1,3}$ illustrates that, besides feature family A (1010), the only other inactive family is B (1020); since the set of previously identified determinant feature families does not contain B (1020), we add family B (1020) as a determinant of feature family A (1010). Interaction (1050) $i_{1,3}$ illustrates that families B (1020) and C (1030) are inactive, in addition to family A (1010). However, since at least one of these families has been previously identified as a determinant, no action is required. Interaction (1050) $i_{1,4}$ illustrates that all feature families, including D (1040), are inactive. However, it is not necessary to include D (1040) as a determinant, as either family B (1020) or C (1030) provides a distinction for this pattern. Thus, a determination may be made that feature family A (1010) is determined by both feature families B (1020) and C (1030). This result may be stored as a group of local super-configurations associated with deterministic feature family A (1010), where all feature families other than A, B and C are trivialized. In this case, 5 entries would exist; however, in general, we could have repeated patterns, as well as overlap that would have to be removed.

The present disclosure contemplates that replacing the deterministic family with its determinants can be implemented by the application 12 by determining if a block P of non-overlapping super-configurations exists when the application 12 has also identified a series of deterministic relationships $D_i$ that would likely apply to the illustrated block to eliminate certain feature families. One non-limiting approach that may be implemented by the application 12 could include taking the block P and interacting it with the first block of deterministic relationships $D_1$, and then interacting this result with the second block of deterministic relationships $D_2$, and so on, until all deterministic relationships have been processed. For the final result, the application 12 may eliminate the deterministic feature families, retain one copy of each unique super-configurations, detect and remove any overlaps, and compress the final result.

Replacing the deterministic families with its determinants may be implemented by the application using the following logical equations. First, the application 12 may consider the usage rule group encoding feature family A from our stylized example discussed above. Equations 15-16 below illustrate two rules for A:

$$A_1 \rightarrow 1 \qquad (15)$$

$$A_2 \rightarrow B_3 \wedge C_2 \wedge E_2 \qquad (16)$$

Equations 17-19 below illustrate introducing a sixth feature family F, with the following usage rules:

$$F_1 \rightarrow A_1 \wedge E_1 \qquad (17)$$

$$F_2 \rightarrow A_2 \wedge E_2 \qquad (18)$$

$$F_3 \rightarrow A_1 \wedge E_2 \qquad (19)$$

Equations 20-23 illustrate that feature family F is deterministic, where it is a function of both families A and E (note that the combination of $A_2$ and $E_1$ cannot occur because of the rules for feature family A). By inspection, a user could also deduce that feature family A and E can both be expressed as a function of F alone as illustrated below in Equations 20-23:

$$A_1 \rightarrow F_1 \vee F_3 \quad (20)$$

$$A_2 \rightarrow F_2 \quad (21)$$

$$E_1 \rightarrow F_1 \quad (22)$$

$$E_2 \rightarrow F_2 \vee F_3 \quad (23)$$

FIG. 23 illustrates a non-limiting example of a super-configuration matrix (1070) in terms of feature family F (1130) in place of families A (1080) and E (1120), the encoding of the rule group (1140) is now extended to include feature family F (1130). FIG. 23 more particularly exemplifies how the local rules of the stylized example illustrated in FIG. 8 may be processed and extracted and subsequently extended with deterministic relationships.

FIG. 24 illustrates a valid super-configuration (1200) when the deterministic relationships ($d_A^1$ and $d_A^2$) for family A (1080) are interacted with the rule group (1140) for family A (1080). For example, FIG. 24 illustrates interacting super-configuration $p_A^1$ (1160) with the deterministic relationship $d_A^1$ (1170). As illustrated in FIG. 23, the local rule (1140) for super-configuration $p_A^1$ is $A_1 \rightarrow 1$. Also, the local rule (1140) for the super-configuration of $d_A^1$ is $A_1 \rightarrow F_1 \vee F_3$. When the application 12 processes these local rules and takes the logical conjunction (i.e., $p_A^1 \wedge d_A^1$), a valid super-configuration (1200) is provided (i.e., 10 111 111 111 11 101).

If the application interacts the valid super-configurations (1200) of FIG. 23 with the deterministic relationship for family E (1180) from FIG. 23, a final matrix (1300) may be generated with an embedded deterministic relationship (1310) as illustrated in FIG. 25. FIG. 25 illustrates that the application may encode the same configurations as was encoded when feature family F was not present.

In other words, the introduction of the deterministic relationships (1310) into the product definition increased the number of super-configurations (1300) without any change in the product definition. However, at this point, both feature families A (1320) and E (1360) can be eliminated, since the three possible combinations are captured by family F (1370).

Figure 26:
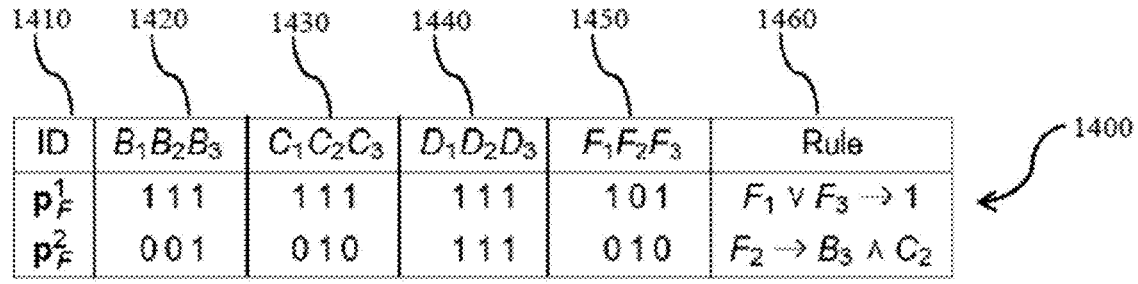
FIG. 26 illustrates another non-limiting table according to one embodiment.

As illustrated in FIG. 26, the application may further generate a local super configuration representation 1400 for the original block of rules for feature family A expressed as rules for feature family F. Further subsequent compression can result back to two super-configurations, where now families A (1320) and E (1360) have been expressed as a function of family F.

Figure 27:
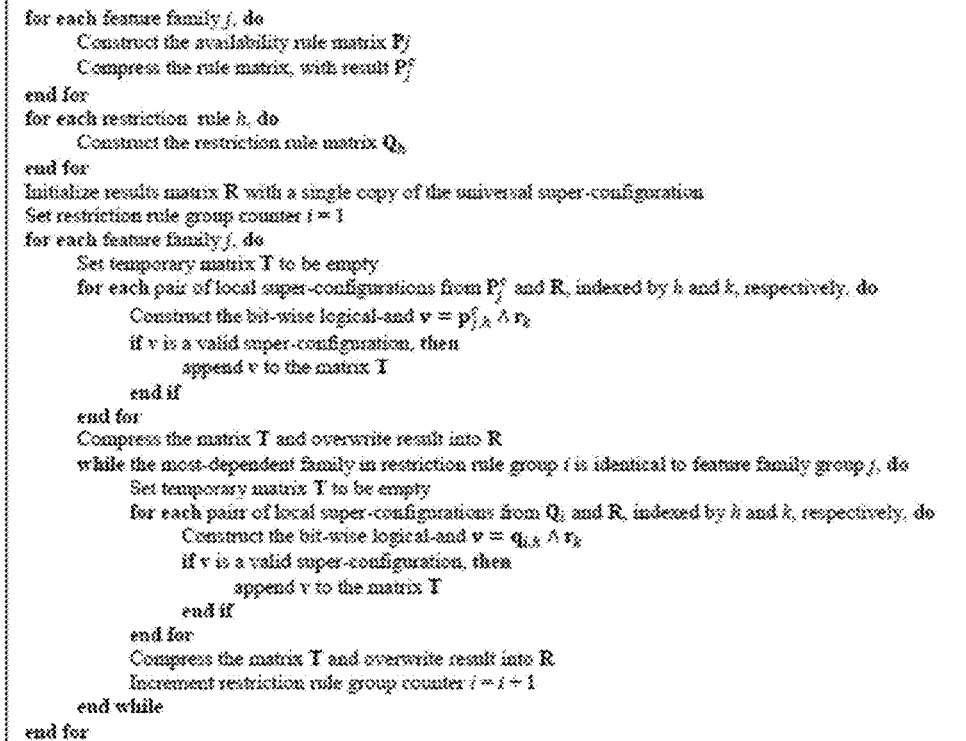
FIG. 27 illustrates another non-limiting pseudo-code according to one embodiment.

FIG. 27 illustrates an exemplary pseudo-code (1500) that may be implemented by the application 12 for generating a set of global, non-overlapping super-configurations (i.e., matrix) from a set of local, non-overlapping availability and restriction rules. Stated differently, FIG. 27 illustrates the algorithm 1500 that may be implemented by the application 12 to construct a global super configuration matrix from one or more local super configurations.

The present disclosure contemplates that the application 12 may interact the sub-matrices within P and Q in a specific, sequential order. However, it may be possible for the application 12 to interact these sub-matrices in any order. In addition, the application 12 may interact arbitrary pairs of sub-matrices, and then the resulting intermediate matrices may be interacted by the application 12. The present disclosure contemplates that each sub-matrix in P and Q should be processed at least once, and that intermediate results be interacted with one another. Interacting a non-overlapping sub-matrix $P_i$ with itself yields the same matrix. Thus, we can, in principle, process a sub-matrix more than once in the super-configuration process. Re-interacting sub-matrices with different sub-matrices may provide early identification of deterministic relationships. This may allow for many potential variations of the super-configuration process, including opportunities to distribute the computations amongst a set of parallel processes. Furthermore, it is also possible to parallelize the Cartesian product calculation between any two sets of local super-configurations, as may be desirable for particularly large problems.

For example, FIG. 28 illustrates a series of valid and invalid (highlighted in gray) super-configurations (1550) that may be found by the application 12. The highlighted super-configurations (1550) which are inactive contain at least one feature family (e.g. A (1570), B (1580), C (1590), D (1600) or E (1610)) that contains all "0" bits. FIG. 28 illustrates that the compressed local super-configuration representation (1550) of the usage rules, in topologically sorted DAG order, as well as the local super-configuration representation (1550) of the restriction rules, after converting to availability rule format, as illustrated in FIG. 16. The initial matrix $R^0$ consists of a single universal super-configuration of all 1's, and the counter for the restriction group may be defined as i=1. A superscript notation may be used to denote interaction number (in this non-limiting embodiment, 0 refers to the initial condition).

The matrix $T^1$ may be initialized by the application 12 to be empty. There may also be no usage rules nor restriction rules converted by the application 12 to generalized availability rules for dependent feature families C (1590), D (1600) and E (1610). As illustrated, the application 12 may perform operation (1560) such that the logical-and of each vector in $P_B$ is taken with the single vector in $R^0$ to produce the result $T^1=P$, since $R^0$ consisted of the universal super-configuration. Application 12 may also not compress of $T^1$, as the application 12 has previously compressed the local rule matrix $P_B$. Hence, $T^1$ may be copied by the application 12 to the result matrix $R^1$, which is identical to $P_B$.

The most dependent feature family of restriction rule group $Q_1$ may be feature family B (1580), which is the same family that was used in completing processing for the original usage rules. If application 12 initializes $T^2$ to be empty, this matrix may be filled by taking the cartesian product of every vector in $R^1$ with $Q_1$. FIG. 28 illustrates that this interaction may be accomplished by the application 12 using 8 logical-and operations (1560), of which 4 result in valid super-configurations (1620).

The resulting set of super-configurations (1620) illustrated may be determined by the application 12 to be incompressible, and the matrix $R^2$ may be replaced by the application 12 with the contents of the matrix $T^2$. The restriction rule group counter may be incremented to 2, and the most dependent feature in this group may be B. Hence, the cartesian product of the results in $R^2$ may be constructed with the matrix $Q_2^B$. FIG. 29 illustrates the super-configuration results (1700) that may be processed by application 12 by interacting the immediate results of the super-configuration (1620) illustrated in FIG. 28 with generalized availability rules in $Q_1$. FIG. 29 further illustrates shaded rows representing invalid super-configurations (1700) that may be found by application 12 which contain at least one feature family that may be inactive. As illustrated, 16 operations (1710) may be completed (4 vectors in $R^2$ interacted with 4 vectors in $Q_2$). After completing all 16 operations (1710), only 6 valid super-configurations (1700) (i.e., unshaded rows) remain.

The application 12 may inspect the super-configuration (1700) of FIG. 29 to determine if the results (1770) $t_5^3$ and $t_6^3$ are compressible in the dimension of feature family D (1750), as the sub-vectors for all remaining feature families A (1720), B (1730), C (1740) and D (1760) are identical between these two super-configurations. Hence, as illustrated in FIG. 30, the matrix $R^3$ (1800) is given by 5 vectors, with $r_1^3=t_1^3$, $r_2^3=t_2^3$, $r_3^3=t_3^3$, $r_4^3=t_4^3$, and $r_5^3=t_5^3 \vee t_6^3$. FIG. 30 illustrates the results application 12 may determine after interacting $P_B$ with both sets of generalized availability rules, $Q_1$ and $Q_2$, while compressing after each stage of processing.

At this point, application 12 may have completed processing all the restriction rule blocks and the availability rule block $P_A$ may remain, which may consist of two local super-configurations. The process of application 12 may then interact the group of 5 intermediate super-configurations (1800) in FIG. 29 with the pair of local super-configurations in $P_A$ in order to yield the super-configuration results (1900) illustrated in FIG. 31. In other words, FIG. 31 illustrates an exemplary result which may be implemented by application 12 of interacting compressed availability rules in $P_B^1$ with the generalized availability rules in $Q_1^B$. Again, the shaded rows illustrate invalid super-configurations (1900) as they contain at least one feature family (i.e., A (1920), B (1930), C (1940), D (1950) or E (1960)) may be inactive.

The final super-configuration results (2000) of application 12 are illustrated in FIG. 32. It is contemplated that the super-configuration results (2000) may be the results obtained after interacting $P_B$ with both sets of generalized availability rules, $Q_1$ and $Q_2$, with compression performed after each stage of processing. As illustrated, the six super-configurations (2000) represent 15 unique configurations as indicated by the configuration number (2070). The final super-configuration set (2000) also may have no remaining interactions. In other words, no further reduction may be possible because the logical-and of any pair of the illustrated super-configurations (2000) may result in an invalid super-configuration, where at least one feature family A (2020), B (2030), C (2040), D (2050), E (2060) is inactive (i.e. contains all "0's").

It is further contemplated that application 12 may implement a process for generating a matrix of super-configurations from a list of Boolean algebraic rules. The process implemented by application 12 may require that a list of families be specified if a restricted view is desired (e.g., marketing versus engineering views). However, it may be insufficient for application 12 to process only the feature families specified. Instead, those feature families for which the specified feature families have some sort of interaction may be processed, as provided by analysis of the DAG associated with the product definition rules. At a high level, the application 12 may implement the following steps to generate a pruned matrix of super-configurations:

Create a list of feature families to include in the final matrix of super-configurations;
Augment the list with those feature families on which the specified feature families are dependent;
Run the super-configuration process;
Eliminate augmented feature families from matrix of super-configurations;
Extract unique binary vectors, keeping only a single copy of a super-configuration;
Eliminate overlap between resulting super-configurations; and
Compress the final matrix.

The application 12 may not process the above steps in the sequence listed, but instead may perform these steps in any number of varying sequences. It is also contemplated that the step of eliminating overlap may require additional processing to eliminate overlap between super-configurations. In general, this step may require comparing every possible pair of super-configurations to determine if there is overlap (i.e., if it is possible to generate the same configuration from more than a single super-configuration). Two super-configurations $s_h$ and $s_k$ may be compared by application 12 for overlap by forming the logical-and of the two candidates, $u_{h,k}=s_h \wedge s_k$. If $u_{h,k}$ results in a valid super-configuration, then we have a condition of overlap, as $u_{h,k}$ indicates exactly the configurations that are common between the two candidate super-configurations. Such a non-limiting example may be referred to as an overlap configuration. Elimination of overlap may require correction of one of the two candidate super-configurations, such that the result does not cover the overlap super-configuration (i.e., that only one of the two candidate super-configurations contains the overlap after processing).

When overlap is found by application 12, a correction process should first consider whether the overlap configuration $u_{h,k}$ may be exactly equal to either of the two super-configurations which were interacted. If such condition exists, the application 12 may eliminate that particular super-configuration which is equal to the overlap configuration. Otherwise, the overlap detected in $u_{h,k}$ should be removed from either $s_h$ or $s_k$.

The present disclosure contemplates that overlap elimination may be performed to treat the overlap super-configuration $u_{h,k}$ as a restriction rule applied to one of the two candidate super-configurations. For example if $s_k$ is arbitrarily chosen as the super-configuration which will be corrected for overlap, the process would mask $v_k=s_k \oplus u_{h,k}$, where $\oplus$ is the logical exclusive or operator. This mask provides an indication of fields which may be created in the super-configuration $s_k$ which must be successively corrected to eliminate the overlap. Overlapping super-configuration may be fragmented by this process, spawning multiple non-overlapping super-configurations. In other words, overlap elimination may result in an increase in the number of super-configurations.

Application 12 may also determine that g indexes the candidate super-configuration from which to overlap may be eliminated. The process begins begin by first removing $s_g$ from the list of valid super-configurations. The next step requires initializing the local super-configuration $x_g^0=1$ to the universal super-configuration. Then, for each family j that is active in the vector $v_g$, the application 12 may perform the following steps: (1) initialize the corresponding local super-configuration by $x_g^j=x_g^{j-1}$, i.e., start with the local super-configuration associated with the result of processing the previous active family or from the universal super-configuration if j is associated with the first active feature family; (2) complement the previously processed active feature family sub-vector: $x_{g,j-1}^j = \neg x_{g,j-1}^j$ (this step is skipped if we are processing the first active feature family in $v_g$); (3) set $x_{g,j}^j=v_{g,j}$ (note that the exclusive-or operation in constructing $v_g$ effectively masks which features should be active to eliminate overlap); (4) take the logical-and of this local super-configuration with the original super-configuration to create a corrected super-configuration, $s_g^j = s_g \wedge x_g^j$, and add $s_g^j$ to the list of valid, non-overlapping super-configurations; (5) repeat steps (2) through (4) until all active feature families in $v_g$ have been processed. The present disclosure contemplates that by construction this system or process may generate super-configurations which are non-overlapping with one another as well as non-overlapping with the super-configuration $s_h$, the configuration which we have chosen to keep intact.

FIG. 33 illustrates pseudo-code (2100) which may be implemented by the p application 12 to detect and eliminate overlap.

Figure 34:
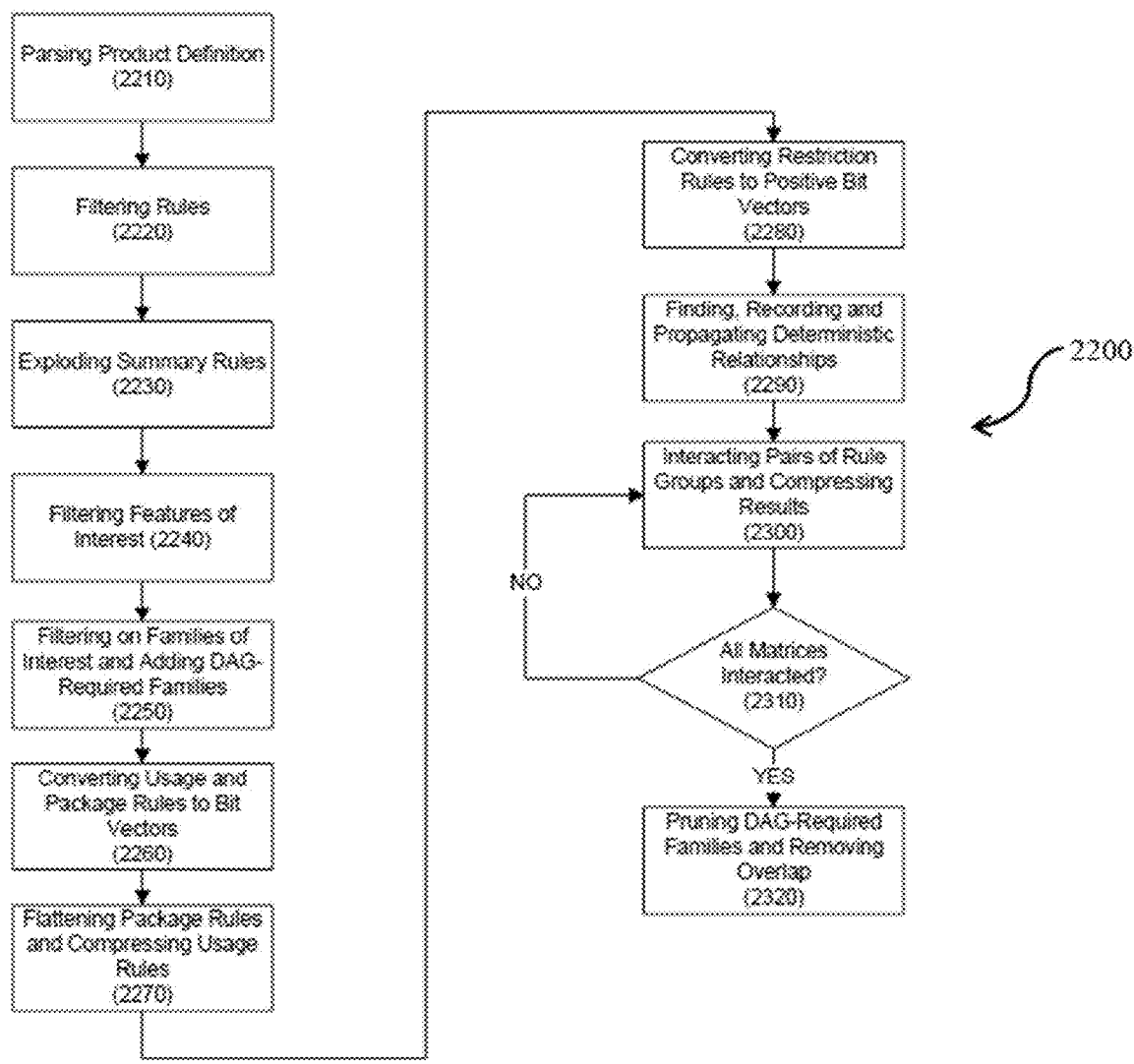
FIG. 34 illustrates a non-limiting flow diagram according to one embodiment.

FIG. 34 is an exemplary flow diagram (2200) illustrating one non-limiting embodiment of the procedure implemented by the application 12 to construct a global super-configuration matrix from a set of local rules. It should be noted, however, that the flow diagram 2200 is merely exemplary, and the operation, function, steps, and/or order of the flow diagram 2200 may be performed in a fashion other than the order described herein.

With reference back to FIG. 34, the flow diagram 2200 illustrates a process of transforming a product definition, given by a set of local rules, into a super-configuration matrix. The flow diagram 2200 illustrates steps of how the resulting super-configuration matrix may be augmented with representations of deterministic relationships between features from different families.

Flow diagram 2200 may begin at operation 2210 where the product definition is parsed according to a set of families, features and/or rules. Parsing may occur by first reading the product definition from a data source (e.g., electronic database) and storing the available families, features, and rules. The families, features, and rules may be stored in a database or other electronic file format known to one skilled in the art such as tabular, matrix or list format. Operation 2210 contemplates that the features should all belong to one valid defined family and that each rule should only involve valid features. Operation 2210 further contemplates that each family should have two or more defined features. If operation 2210 determines that a family has less than two defined features, that family may be dismissed as being trivial.

Flow diagram 2200 then proceeds to operation 2220 where one or more filter rules may be applied to ensure that only timing points of interest are included in the resulting super-configuration matrix. Operation 2220 contemplates that the filtered timing points of interest may be a named event with an associated date. Operation 2220 further contemplates that each rule may have a pair of timing points that indicate a "begin" and "end" event. The rules used may also only be valid between the filtered timing points inclusive of the "begin" event date and exclusive of the "end" event date. Moreover, only those rules that are valid during the targeted time period may be retained.

In one non-limiting example, an automotive vehicle application may include a product definition having timing points {BeginEvent, PreBuild, Job1, Job2, and EndEvent}. For this vehicle application it may also be desirable to include only those product definitions which are valid for dates on or after timing point "Job1." In order to acquire the desired results, operation 2220 may discard any rule with a begin-event after Job1 (Job2 or EndEvent) or an end-event on or before Job1 (BeginEvent, PreBuild or Job1). Operation 2220 may discard these rules because they are not valid for dates on or after the timing point "Job1."

Flow diagram 2200 may then proceed to operation 2230 where the summary rules may be exploded (i.e., expanded). Expansion of the summary rules may be required when shorthand notation by the rule authors (i.e., programmers or codifiers) is used. However, it should be noted that should shorthand notation not be used operation 2230 may not be required by flow diagram 2200. Moreover, operation 2230 may also not be required if flow diagram 2200 has the capability to interpolate the shorthand notation used by rule authors.

With reference back to operation 2230, one non-limiting example of an automotive vehicle application may exist if a summary rule of "North American markets" is a shorthand notation for an expanded market that may be codified as "Canadian market OR Mexican market OR U.S. market". In such an example, operation 2230 would replace the target of the shorthand summary rule (i.e., "North American markets") with its atomic values (i.e., "Canadian market OR Mexican market OR U.S. market") everywhere the target is found in all other product definition rules.

Flow diagram 2200 then proceeds to operation 2240 where filtering of features of interest may occur. Operation 2240 contemplates specific features of interest may be filtered by use of a search-and-destroy technique that operates to remove from the product definition all other features from the corresponding families. Operation 2240 contemplates that the list of features of interest may be evaluated to identify the corresponding feature families, and then the complement of those features from any rules in which they appear may be removed. Operation 2240 further contemplates discarding any rule that involves one or more of the families of interest, but does not contain at least one of the specific features of interest for each family.

With reference to the prior non-limiting automotive vehicle example, if it is determined that features of interest include only rules which are valid for the U.S. or Canadian markets, all other markets other than U.S. or Canada may be flagged to be discarded. Based on this operation of flagging and discarding, if a rule existed that included an engine that is only available in Great Britain and France, the rule would be modified to discard Great Britain and France, and then the rule may be discarded because no market features remain. However, if there is a rule that defines an engine that is available in Canada or Mexico, the Mexican market is discarded and the rule is preserved as the rule still requires the Canadian market.

Operation 2240 then continues recursively and after features flagged to be discarded are processed, the remaining rules are analyzed to determine if any features exist that may no longer have an optionality rule. Any features found to meet these criteria may also be flagged and discarded. The filtering continues until no additional features are identified for discarding. For example, in the automotive vehicle application, any engine that is not available in the U.S. or Canada may ultimately result with no optionality rules. These engines may be flagged to be discarded. As a result of discarded engines, if a rule included a transmission that is only available with one of the discarded engines, that transmission would also discarded.

With reference back to flow diagram 2200, operation 2250 contemplates filtering families of interest. Operation 2250 may identify which feature families in the product definition have not been tagged to be retained as part of the output, but may be required for generating a correct super-configuration representation. Operation 2250 first determines the list of all feature families which may need to be maintained in the final output. Operation 2250 also contemplates that additional families may require consideration in order to capture relationships between families in the output list. Operation 2250 further contemplates that the application 12 may construct and implement a directed acyclic graph (DAG) to captures these relationships. After creating and sorting the DAG from the full set of rules, Operation 2250 may target families that can be identified within the sorted DAG. For any family targeted for output, the DAG is inspected to identify any other families on which the targeted family is considered to be dependent. If any of these identified families are not targets for output, then Operation 2250 adds these identified families as DAG-required families. Operation 2250 is a recursive process, and for each added family, the operation is repeated until no new DAG-required families are identified.

With reference back to the automotive vehicle application example, if identification of all possible paint and trim combinations for a given market is required, and the availability of one or more paints is dependent on the series, Operation 2250 would use the DAG to identify this condition. Once identified, Operation 2250 would add the series family to the DAG-required family. Operation 2250 would then continue to search for any family which the series family is dependent would. If any further families are found, Operation 2250 would add them as a DAG-required family. This search-and-add sequence would continue until all DAG-required families are identified. By including DAG-required feature families, Operation 2250 ensures all direct and indirect relationships between the feature families targeted for output are captured.

Flow diagram 2200 then proceeds to Operation 2260 where the usage and package rules are converted to bit vectors. Operation 2260 may convert the package rules to generalized availability rules using the flattening process described above. In converting the package and usage rules to bit-string representations, Operation 2260 may retain information regarding which features (left-hand-side features) were considered to have dependencies.

Flow diagram 2200 then proceeds to Operation 2270 where the bit-string representations of the package rules and the usage rules are flattened. Flattening of the package and usage rules changes the bit-string representation of these rules. As a result, Operation 2270 may subsequently compress all usage rule groups to generalized availability rules as described above.

Flow diagram 2200 then proceeds to Operation 2280 where the restriction rules are converted to a group of generalized availability rules. Flow diagram 2200 further proceeds to Operation 2290 where deterministic relationships are found, recorded and propagated. Operation 2290 operates by identifying all fully and partially deterministic relationships within the rule groups. Operation 2290 may only process originally flattened usage rules.

The present disclosure contemplates that application 12 may not obtain deterministic relationships within generalized availability rules as generated by converting restriction rules. The present disclosure also contemplates that any feature families which were determined to be DAG-required in Operation 2250 may not be considered as determinants, as these families will not be reported in the final output. The present disclosure further contemplates that it may be especially useful to identify if any DAG-required families are deterministic, as such an identification may provide dramatic improvement in computational processing speed. Upon finding all deterministic relationships within the rule groups, Operation 2290 may propagate these relationships to all other rule groups, and the deterministic features may be eliminated from further consideration.

Flow diagram 2200 then proceeds to 2300 which iteratively interacts each pair of rule groups and resulting matrices. Operation 2300 continues until all matrices have been interacted. Operation 2300 also compresses the intermediate results of each interaction. The present disclosure contemplates that Operation 2300 may not compress each intermediate result. However, by not requiring compression the present disclosure also contemplates that the resulting matrices may become inefficiently large for downstream computation. Operation 2300 then proceeds to interact the current results matrix with the next block of rules encoded as bit-string to produce the next intermediate results matrix. The present disclosure contemplates alternative embodiments that may be configured to process sets of matrices in parallel or in a strategically determined order.

Flow diagram 2200 then proceeds to Operation 2310 where it is determined whether all of the blocks of rules and intermediate result matrices have been interacted so that only a single matrix of global super-configurations remains. If no, flow diagram 2200 returns to Operation 2300. If yes, flow diagram 2200 proceeds to operation 2320.

Operation 2320 proceeds to prune all DAG-required families from the super-configuration matrix. Once the families are removed Operation 2320 determines whether any overlap has been introduced into the resulting matrices. If Operation 2320 determines an overlap exists between super-configurations, removal of the overlap occurs. Upon completion of Operation 2320, a matrix of fully interacted, non-overlapping super-configurations augmented by a series of matrices denoting deterministic relationships is developed.

The present disclosure contemplates that the process described in flow diagram 2200 provides a computationally efficient process for problems ranging from low to moderate complexity, where the resulting matrix size may be on the order of 10,000 rows or less. However, for complex problems (i.e., automotive vehicle applications that may span multiple variations across multiple markets), the present disclosure contemplates that the process disclosed in flow diagram 2200 where each DAG-required feature families are pruned after all rule groups have been interacted often requires substantially more computational power and time than the interaction process itself.

The present disclosure further contemplates that the number of compressed super-configurations within intermediate results may tend to increase as more and more rule groups are processed. The largest compressed intermediate super-configuration matrix may be processed, in terms of rows, near the end construction of the global super-configuration matrix. However, the computational process of pruning DAG-required families scales processing power and storage space as the square of the number of rows in the matrix increase in size and complexity.

The present application contemplates that one non-limiting alternative may require the super-configuration application performing the pruning process in-line with generation of intermediate results. Generally, computational processing power and storage space may be reduced if the DAG-required feature family can be pruned from an intermediate result when that family no longer appears in subsequent rule groups. Processing power and storage space (i.e., more computationally efficient algorithm) may therefore be reduced if the rule groups near the end of processing do not contain any DAG-required families. Alternatively, processing power and storage space may be increased (i.e., less computationally efficient algorithm) if there are rule groups with DAG-required feature families near the end of processing, and intermediate results are larger in terms of number of matrix rows than what would be observed at the end of the interaction process disclosed in Operation 2300.

Figure 35:
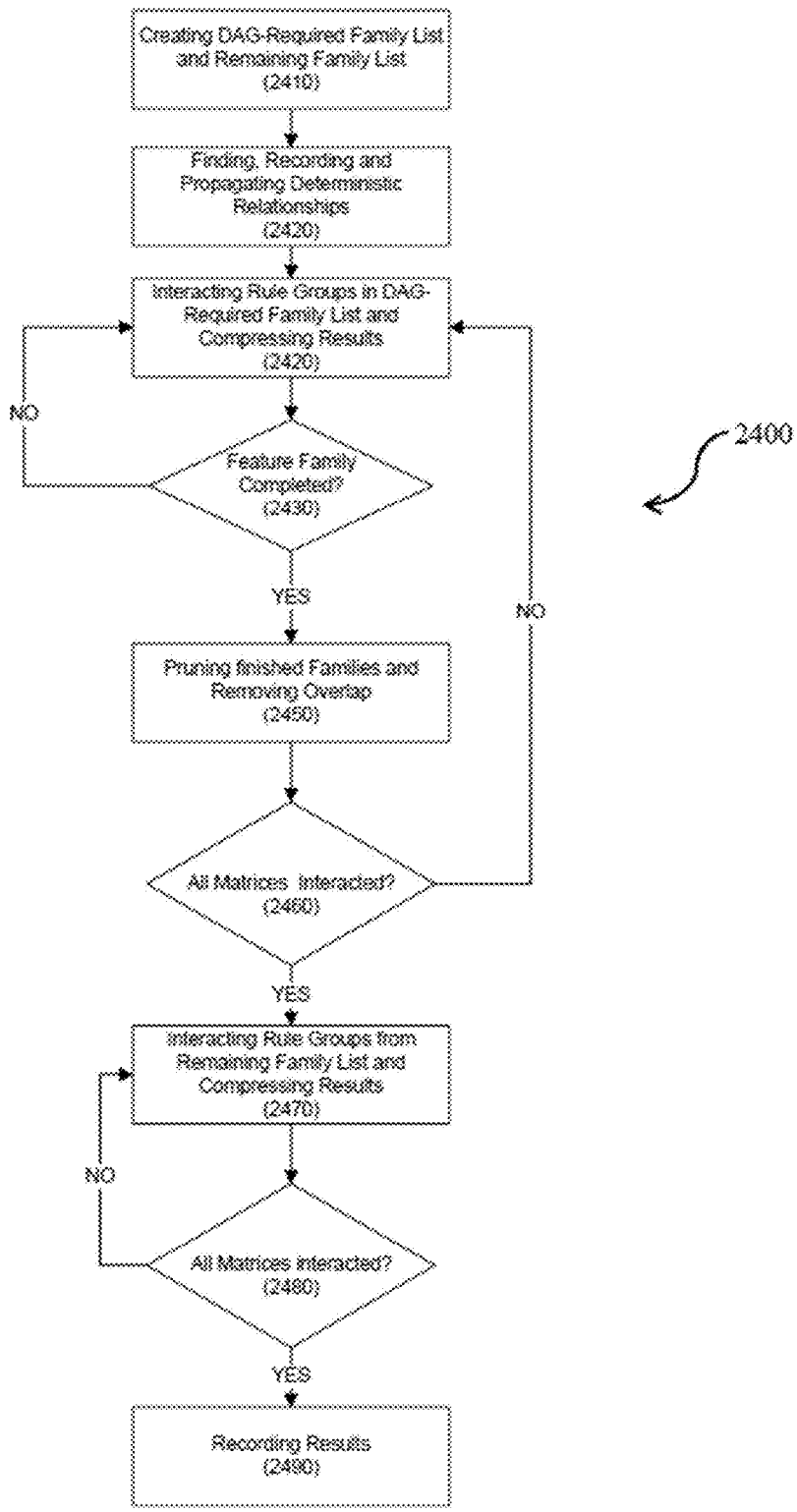
FIG. 35 illustrates another non-limiting flow diagram according to one embodiment.

FIG. 35 shows an alternative flow diagram 2400 which may be implemented by the application 12 for in line pruning of DAG-required feature families with a re-ordering of rule groups such that the DAG-required families are pruned earlier than disclosed with reference to flow diagram 2300. It is again noted that the flow diagram 2400 is merely exemplary, and the operation, function, steps, and/or order of the flow diagram 2400 may be performed in a fashion other than the order described herein.

Flow diagram 2400 shows an alternative non-limiting alternative where Operations 2410-2490 may replace Operations 2290-2320 of flow diagram 2200. However, the present disclosure contemplates that the alternative flow diagram 2400 would process those rule groups which include DAG-required feature families first, respecting the sorted DAG order, while simultaneously pruning any DAG-required feature families from intermediate results once they are known to no longer appear in subsequent rule groups.

Flow diagram 2200 disclosed a super-configuration application that interacted rule groups in sorted DAG order and typically interacted those rule groups which are dependent on feature families which have no dependencies before other rule groups are interacted. The present disclosure contemplates that the process disclosed in flow diagram 2200 may only process some rule groups with DAG-required feature families near the end of processing.

However, Operation 2410 of the alternative flow diagram 2400 operates by creating lists of rule groups, with the first group including DAG-required feature families in some non-trivial fashion ("List A") and the second group being independent of DAG-required feature families ("List B"). Flow diagram 2400 then proceeds to operation 2420 and interacts the rule groups in List A and compresses the results in the same mode as was disclosed in Operation 2290 above.

Flow diagram 2400 then proceeds to Operation 2430 where each rule group stored in list A is interacted. Operation 2430 continues until all the matrices stored in list A have been interacted. Operation 2430 also compresses the intermediate results of each interaction of list A. The present disclosure contemplates that Operation 2430 may not compress each intermediate result. However, by not requiring compression the present disclosure also contemplates that the resulting matrices may become inefficiently large for downstream computation. Operation 2430 then proceeds to interact the current results matrix with the next block of rules encoded as bit-string to produce the next intermediate results matrix.

Flow diagram 2200 then proceeds to Operation 2440 where it is determined whether any of the DAG-required feature families are fully processed. If no, flow diagram 2400 returns to Operation 2430. If yes, flow diagram 2400 proceeds to operation 2450.

Operation 2450 proceeds to prune the fully processed DAG-required feature families and to remove any overlap. Flow diagram 2400 then proceeds to operation 2460 where it is determined whether all the matrices in list A have been interacted. If no, flow diagram 2400 proceeds back to Operation 2430. If yes, flow diagram 2400 proceeds to Operation 2470.

Operation 2470 proceeds to interact the rule groups in List B and compress the results in the same mode as was disclosed in Operation 2290 above. Stated differently, Operation 2470 begins the process of interacting the rule group of feature families that are independent of DAG-required feature families and compressing the results in the same mode as was disclosed in Operation 2290 above. Flow diagram 2400 then proceeds to operation 2480 which determines whether all the matrices in List B have been interacted. If no, flow diagram 2400 proceeds back to Operation 2470. If yes, flow diagram 2400 proceeds to operation 2490.

Operation 2490 then stores the matrix of fully interacted, non-overlapping super-configurations augmented by a series of matrices denoting deterministic relationships that is developed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for establishing a deterministic relationship, the method comprising:
    receiving at one or more computers a product definition that includes two or more binary vectors, wherein each binary vector encodes one or more product configurations that include at least one sub-vector indicative of a feature family having one or more bits each indicative of a product feature, and the product definition being stored in a computer storage medium associated with the one or more computers;
    identifying one or more feature families as sparse if all of its corresponding sub-vectors have a single product feature that is active;
    selecting at least one of the identified sparse feature families;
    calculating Cartesian products by interacting corresponding bits of pairs of binary vectors;
    establishing a deterministic feature family by identifying if all of the interacted binary vectors have one or more inactive feature families other than the selected sparse feature family;
    establishing if one or more determinant families exist by identifying one or more lists of inactive feature families from all interactions from the binary vectors;
    storing to an array the lists of inactive feature families, wherein the stored lists of inactive feature families are unique;
    compressing the product definition excluding the identified deterministic relationship from consideration;
    augmenting the compressed product definition per the relationship between the deterministic feature family and the one or more determinant families; and
    transmitting the product definition including the deterministic relationship to at least one of a nomadic device, a personal computer and a server.

2. The method of claim 1 further comprising summing the number of feature families within the stored lists.

3. The method of claim 2 further comprising sorting the stored lists based upon an increasing count of the number of feature families within the lists.

4. The method of claim 3 further comprising selecting one feature family from the stored lists and adding the selected feature family to a determinant family list if the intersection between the elements of the feature family list and the determinant family list is empty.

5. The method of claim 4 further comprising processing all of the stored lists.

6. The method of claim 5 further comprising extracting deterministic relationships between the one or more determinant families and the deterministic feature family.

7. The method of claim 6 further comprising:
copying the product definition;
trivializing the one or more feature families from the copied product definition that are not found to be a deterministic feature family;
trivializing the one or more feature families from the copied product definition that are not found to be a determinant family;
removing overlap from the trivialized product definition;
compressing the trivialized product definition; and
storing as an isolated deterministic feature family product definition the trivialized product definition.

8. The method of claim 4, further comprising:
receiving a list of the feature families that are identified as being selectable;
determining multiple sets of the determinants; and
selecting at least one of the set of determinants based on the list of the feature families.

9. The method of claim 4, further comprising
determining multiple sets of the determinants; and
selecting at least one of the set of determinants based on the number of product features within the feature families.

10. The method of claim 1 further comprising:
removing the deterministic feature family from the product definition;
removing overlap from the product definition; and
storing as a simplified product definition the result of compressing the product definition.

11. A system for establishing a deterministic relationship, the system comprising:
a first server with a processor configured to:
receive at one or more computers a product definition that includes two or more binary vectors, wherein each binary vector encodes one or more product configurations that include at least one sub-vector indicative of a feature family having one or more bits each indicative of a product feature, and the product definition being stored in a computer storage medium associated with the one or more computers;
identify one or more feature families as sparse if all of its corresponding sub-vectors have a single product feature that is active;
select at least one of the identified sparse feature families;
interact pairs of the binary vectors by taking a logical-and of corresponding bits; and
establish a deterministic feature family by identifying if all of the interacted binary vectors have one or more inactive feature families other than the selected sparse feature family;
establish if one or more determinant families exist by identifying one or more lists of inactive feature families from all interactions from the binary vectors;
store to an array the lists of inactive feature families, wherein the stored lists of inactive feature families are unique;
compress the product definition excluding the identified deterministic relationship from consideration;
augment the compressed product definition per the relationship between the deterministic feature family and the one or more determinant families; and
transmit the product definition including the deterministic relationship to at least one of a nomadic device, a personal computer and a second server.

* * * * *